US010733695B2

(12) United States Patent
Andersson et al.

(10) Patent No.: US 10,733,695 B2
(45) Date of Patent: Aug. 4, 2020

(54) PRIMING HIERARCHICAL DEPTH LOGIC WITHIN A GRAPHICS PROCESSOR

(71) Applicant: Intel Corporation, Santa Clara, CA (US)

(72) Inventors: Magnus Andersson, Helsingborg (SE); Jon N. Hasselgren, Bunkeflostrand (SE); Tomas G. Akenine-Moller, Lund (SE)

(73) Assignee: INTEL CORPORATION, Santa Clara, CA (US)

( * ) Notice: Subject to any disclaimer, the term of this patent is extended or adjusted under 35 U.S.C. 154(b) by 78 days.

(21) Appl. No.: 15/267,907

(22) Filed: Sep. 16, 2016

(65) Prior Publication Data

US 2018/0082431 A1    Mar. 22, 2018

(51) Int. Cl.
*G06T 1/60* (2006.01)
*G06T 1/20* (2006.01)

(52) U.S. Cl.
CPC .......... *G06T 1/60* (2013.01); *G06T 1/20* (2013.01); *G06T 2207/20016* (2013.01)

(58) Field of Classification Search
CPC ..... G06T 15/405; G06T 15/005; G06T 15/40; G06T 1/60; G06T 1/20; G06T 15/20; G06T 2200/28; G06T 15/06; G06T 15/30; G06T 15/08; G06T 15/60; G06T 17/005; G06T 9/40; G06T 2207/20016
See application file for complete search history.

(56) References Cited

U.S. PATENT DOCUMENTS 6,452,685 B2 *  9/2002  Opsal ............... G01N 21/211
                                              356/445
7,388,581 B1 *  6/2008  Diard ............... G06T 1/20
                                              345/421

(Continued)

FOREIGN PATENT DOCUMENTS

WO    2016048521    3/2016

OTHER PUBLICATIONS

PCT Application No. PCT/US2017/042857, Notification of Transmittal of the International Search Report and the Written Opinion of the International Searching Authority, dated Nov. 15, 2017, 8 pgs.

(Continued)

*Primary Examiner* — Jeffrey J Chow
(74) *Attorney, Agent, or Firm* — Jaffery Watson Mendonsa & Hamilton LLP

(57) ABSTRACT

Embodiments described herein enable a hierarchical-Z unit of a graphics processor to be primed using Hi-Z data generated by occlusion culling operations performed on a general purpose processor. One embodiment provides for instructions to cause operations including performing occlusion culling for a scene via the general purpose processor and storing generated hierarchical-Z data. The Hierarchical-Z data generated during the occlusion culling operations can be shared with the graphics processor and used to prime a hierarchical-Z unit of the graphics processor. The at least a portion of the scene can then be rendered using the hierarchical-Z data after priming the hierarchical-Z unit, improving the effectiveness of hierarchical-Z operations of the graphics processor for the scene.

19 Claims, 23 Drawing Sheets

(56) References Cited

U.S. PATENT DOCUMENTS

| | | | |
|---|---|---|---|
| 8,264,503 B1* | 9/2012 | Parenteau | G06T 11/40 |
| | | | 345/619 |
| 8,395,619 B1 | 3/2013 | Diard | |
| 2007/0268291 A1* | 11/2007 | Naoi | G06T 15/405 |
| | | | 345/422 |
| 2008/0225048 A1* | 9/2008 | Bijankumar | G06T 15/40 |
| | | | 345/421 |
| 2010/0182314 A1* | 7/2010 | Akenine-Moller | |
| | | | G06T 15/005 |
| | | | 345/421 |
| 2012/0229445 A1* | 9/2012 | Jenkins | G06T 15/60 |
| | | | 345/418 |
| 2016/0005216 A1* | 1/2016 | Lee | G06T 15/005 |
| | | | 345/422 |
| 2016/0210231 A1* | 7/2016 | Huang | G06F 12/0811 |
| 2018/0018750 A1* | 1/2018 | Jones | G06F 9/5016 |

OTHER PUBLICATIONS

Kiefer Kuah, "Software Occlusion Culling". Jan. 27, 2016, pp. 1-10.

* cited by examiner

GRAPHICS PROCESSOR COMMAND FORMAT
900

| CLIENT 902 | OPCODE 904 | SUB-OPCODE 905 | DATA 906 | COMMAND SIZE 908 |

GRAPHICS PROCESSOR COMMAND SEQUENCE 910

US 10,733,695 B2

PRIMING HIERARCHICAL DEPTH LOGIC WITHIN A GRAPHICS PROCESSOR

TECHNICAL FIELD

Embodiments generally relate to logic to perform graphics processing operations. More particularly, embodiments relate to heterogeneous processing logic for performing graphics processing operations.

BACKGROUND

The dynamic nature of real-time graphics applications make the use of precomputed visibility determination algorithms less desirable. Dynamic visibility determination can be accelerated via the use of hierarchical depth testing (e.g., Hierarchical-Z). Hierarchical-Z is a known feature of modern graphics processing units (GPUs) that enables the GPU to perform high-speed depth testing by rejecting large group of incoming fragments. Depth testing performance is increased in part due to the use of a reduced and compressed version of the depth buffer that can be maintained within on-chip memory or through a cache. A traditional depth buffer is a two-dimensional array storing a depth element for each pixel or depth element for each sample of each pixel of a scene.

In contrast with a traditional depth buffer, a Hierarchical depth buffer stores depth data at a lower granularity or stores different representations of depth data other than a per-pixel representation. Hierarchical depth buffers can be used to perform hierarchical depth culling, or occlusion culling. Occlusion culling is a visibility determination algorithm that is used to identify objects that reside in a view volume to be rendered, but are not visible because those objects are hidden by other objects that are closer to the camera. One implementation of hierarchical occlusion culling utilizes a maximum depth value of a tile of pixels or samples. If the estimated conservative minimum depth of a triangle inside a tile is greater than the maximum depth of the tile, the triangle is completely occluded inside that tile. In this case, the per-sample depth values do not need to be read from memory, and no further processing is performed within the tile for the culled triangle.

GPUs known in the art generally include some form of hierarchical depth culling unit, which can be configured to perform occlusion culling. Differing occlusion culling algorithms can be used in differing implementation of the hierarchical depth unit, and optimization efforts are routinely performed in an effort to achieve high performance and energy efficient operation.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
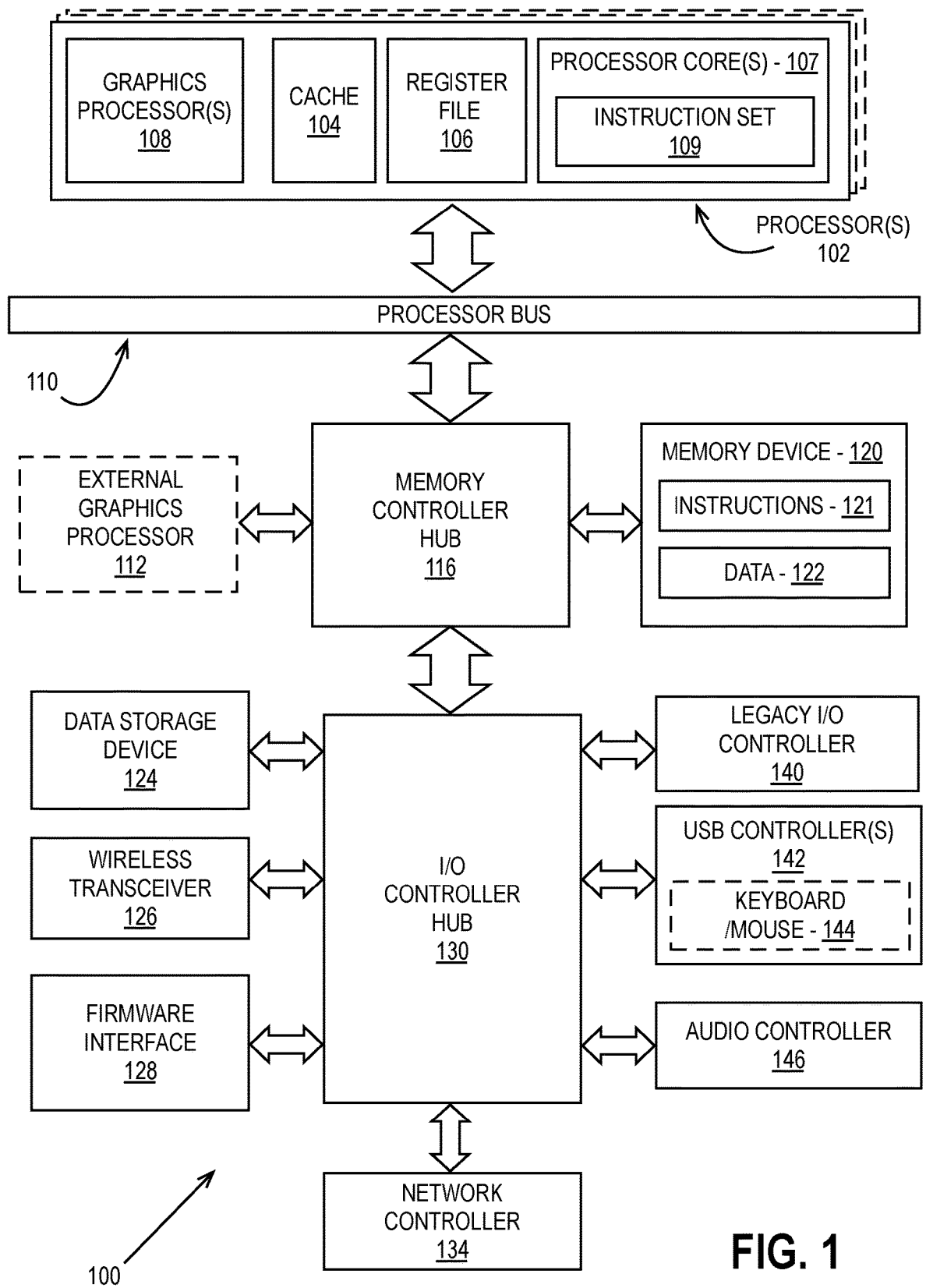
FIG. 1 is a block diagram of an embodiment of a computer system with a processor having one or more processor cores and graphics processors.

Embodiments described herein combine an implementation of a hierarchical depth unit configured to use a multi-layered mask representation of hierarchical depth data with vector processor or co-processor based occlusion culling techniques to enable a heterogeneous hierarchical depth implementation. In one embodiment, to render a frame, a vector processor such as a SIMD enabled central processing unit or co-processor executes parallel processing instructions to perform a first occlusion culling pass using, at least a portion of a software occlusion culling algorithm, such a masked software occlusion culling algorithm or another occlusion culling algorithm suitable for execution on a parallel processor. A graphics processor including a hierarchical depth unit is then primed with depth data generated during the first occlusion culling pass, enabling the hierarchical depth unit of the graphics processor to perform additional depth culling for the frame without requiring the re-generation of hierarchical depth data and enabling earlier culling of geometry via hierarchical depth testing. Priming the hierarchical depth unit refers to the process of providing pre-determined hierarchical depth data to the depth unit, as opposed to a dry startup of the depth unit using a cleared hierarchical depth buffer. The depth unit hardware can be configured to use at least a portion of the pre-determined hierarchical depth data instead of re-generating depth data from the scene.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-14 provide an overview of exemplary data processing system and graphics processor logic that incorporates or relates to the various embodiments. FIGS. 15-23 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data.

System Overview

FIG. 1 is a block diagram of a processing system 100, according to an embodiment. In various embodiments, the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
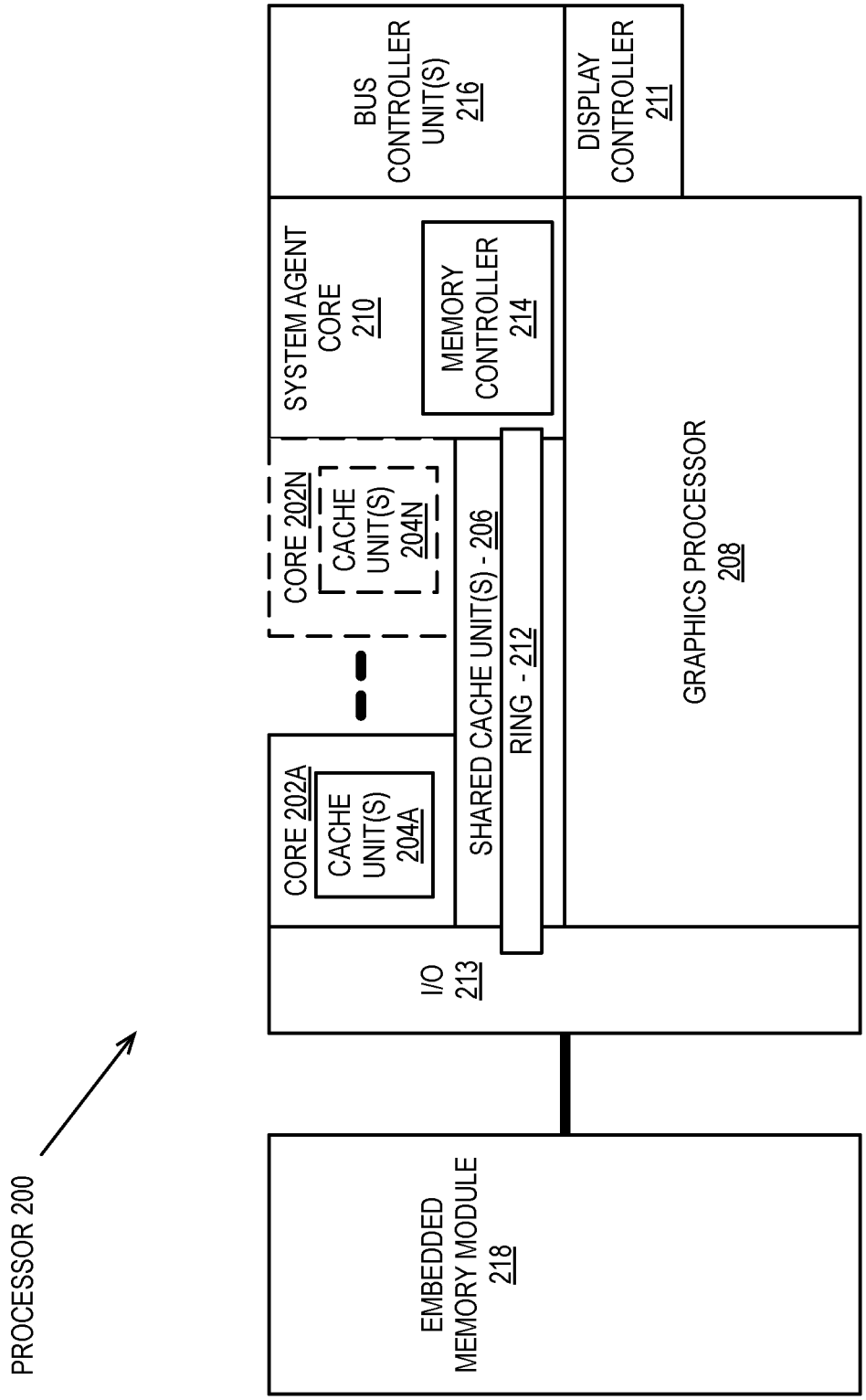
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
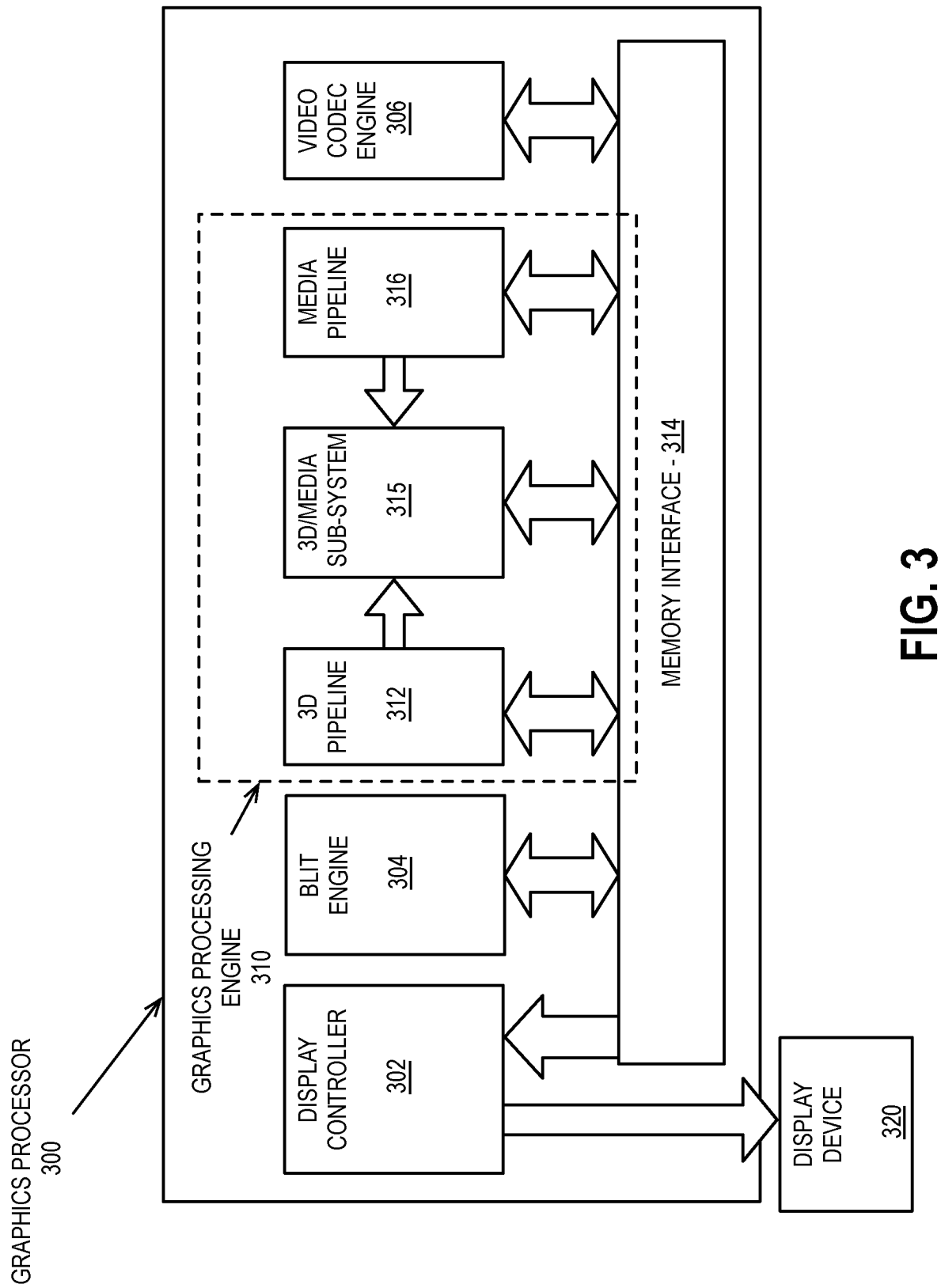
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/ MPEG-4 AVC, as well as the Society of Motion Picture & Television Engineers (SMPTE) 421 MNC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
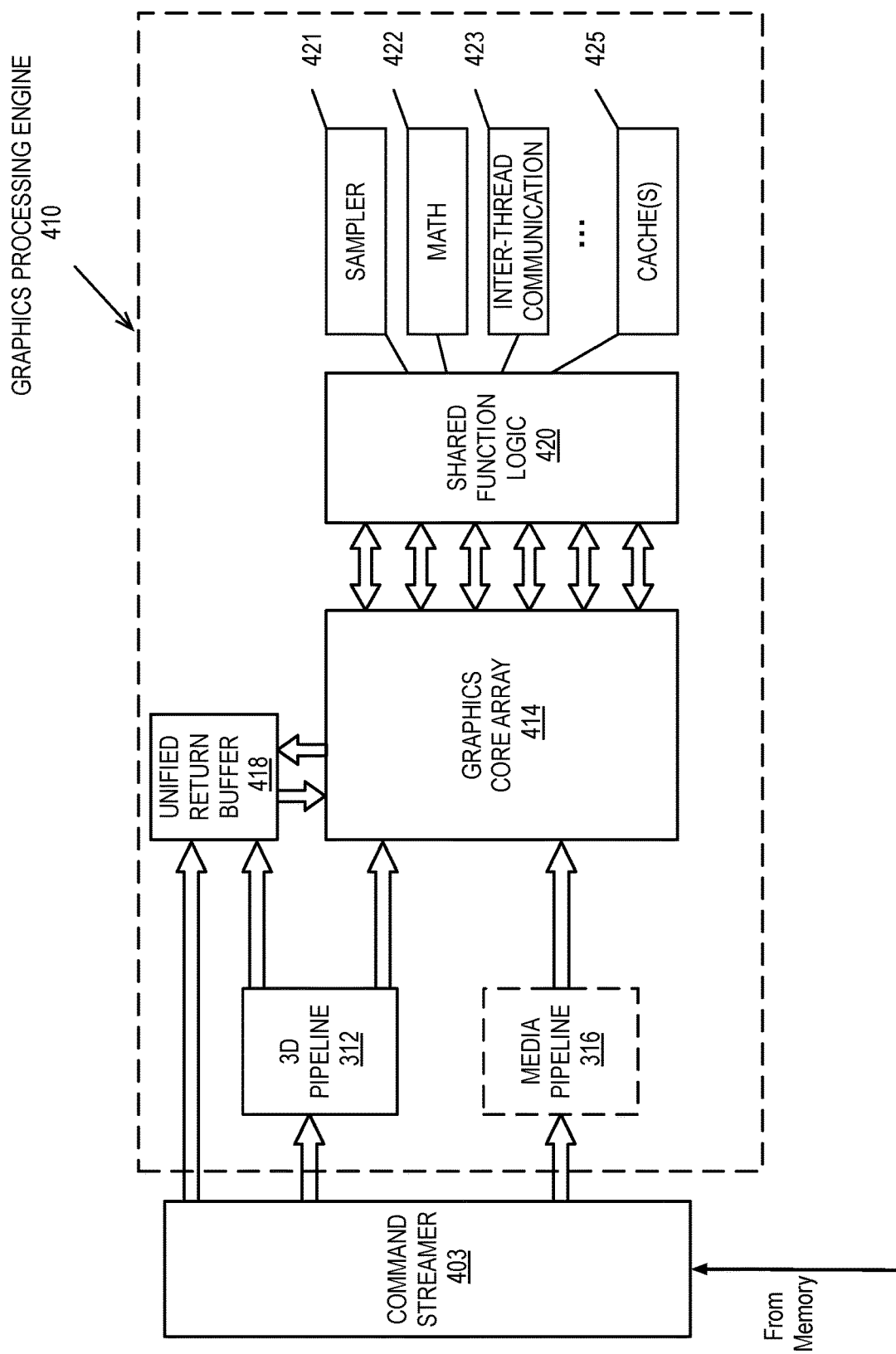
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal tiltering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
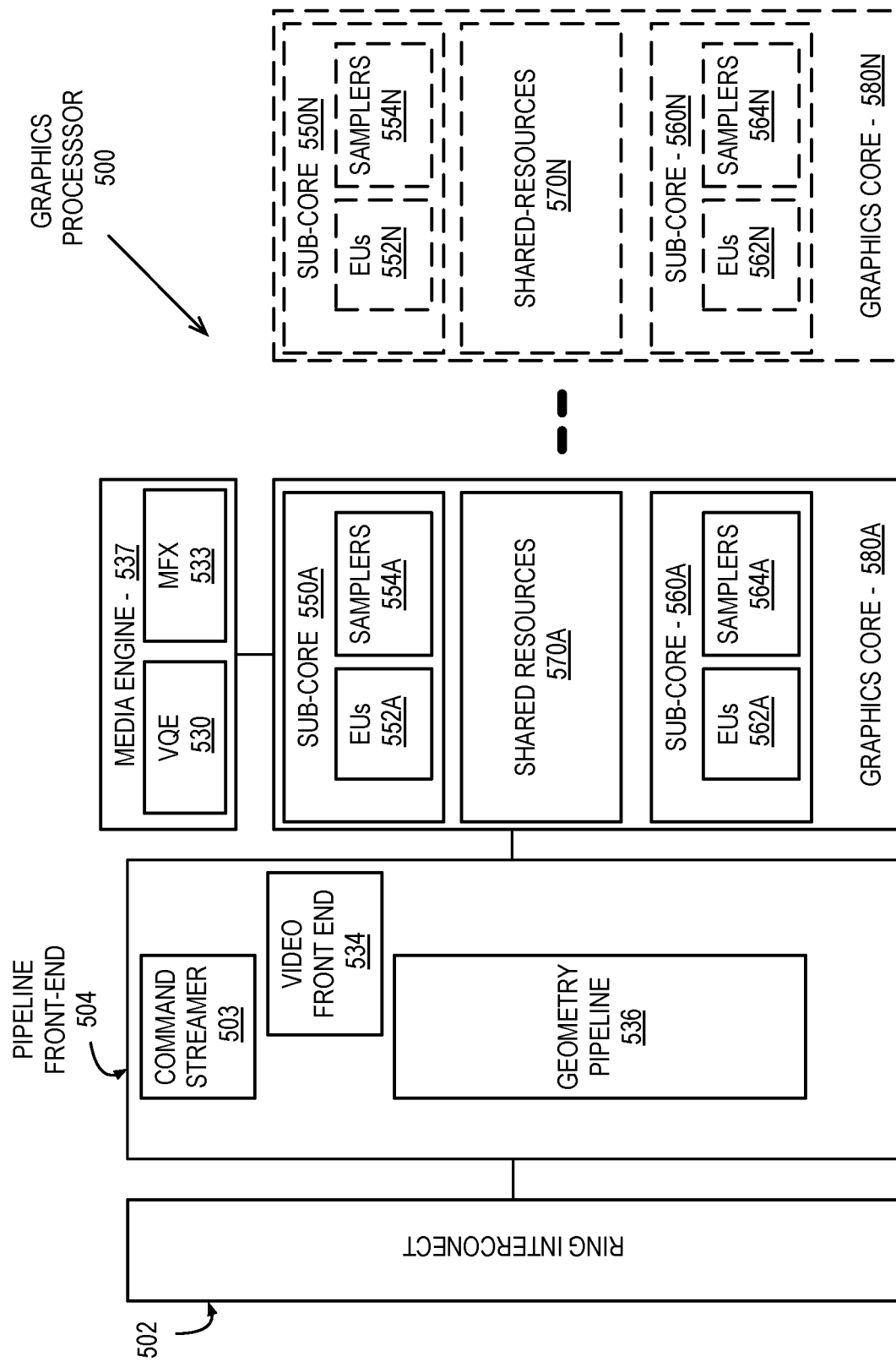
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cures 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
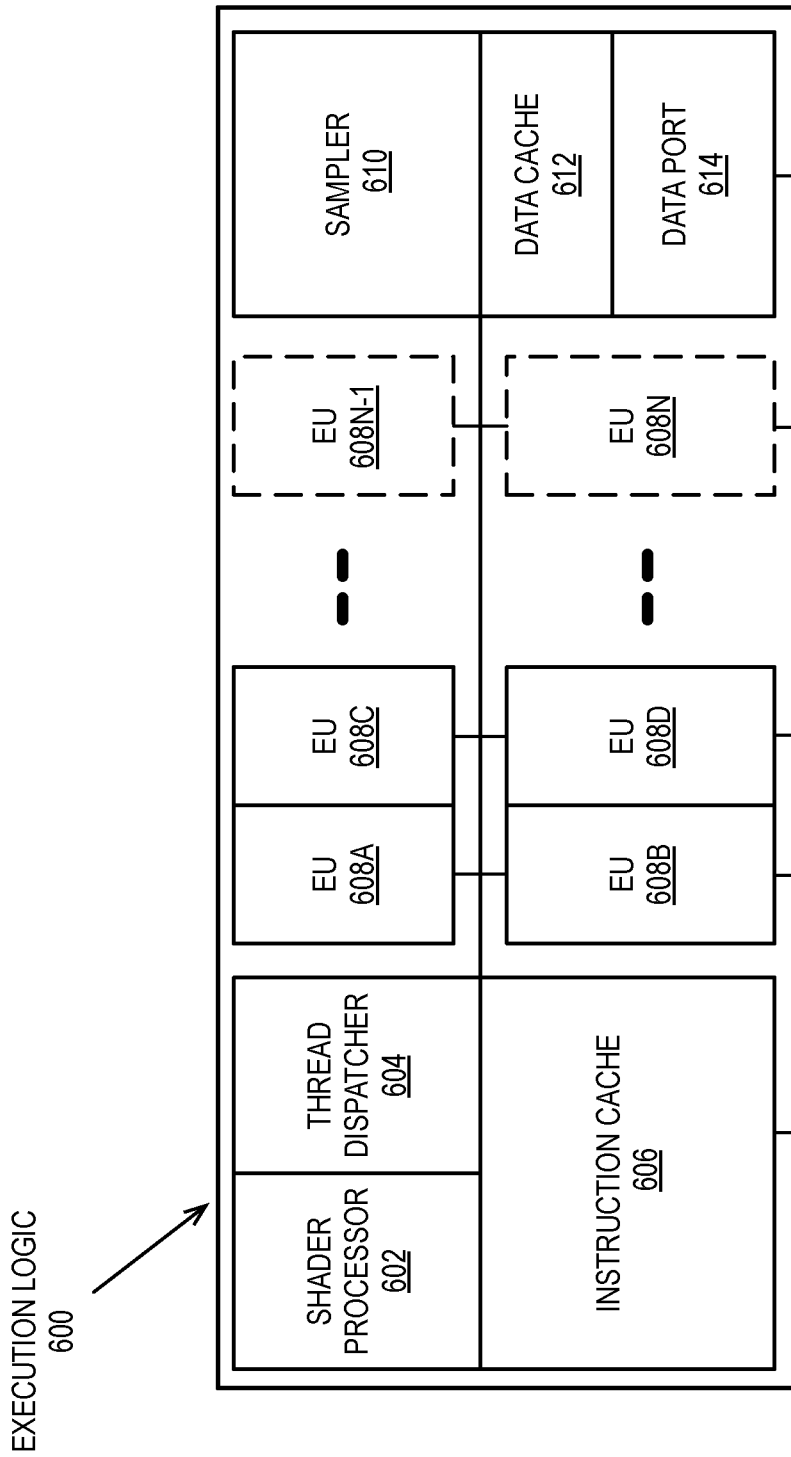
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) or single instruction multiple thread (SIMT) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process run-time thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
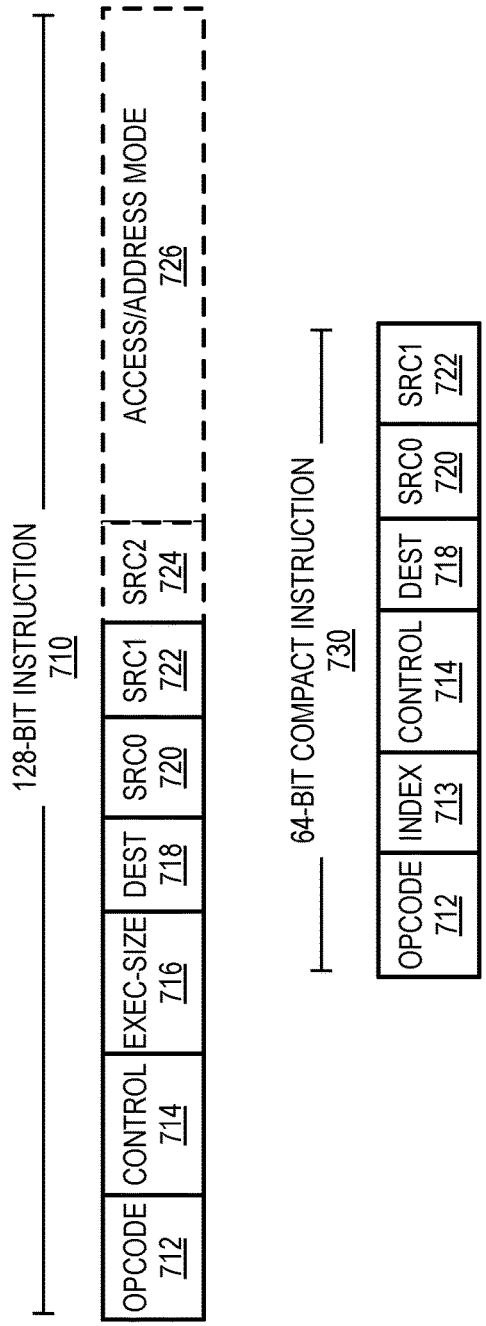
FIG. 7 illustrates a graphics processor execution unit instruction format according to an embodiment.
Figure 7:
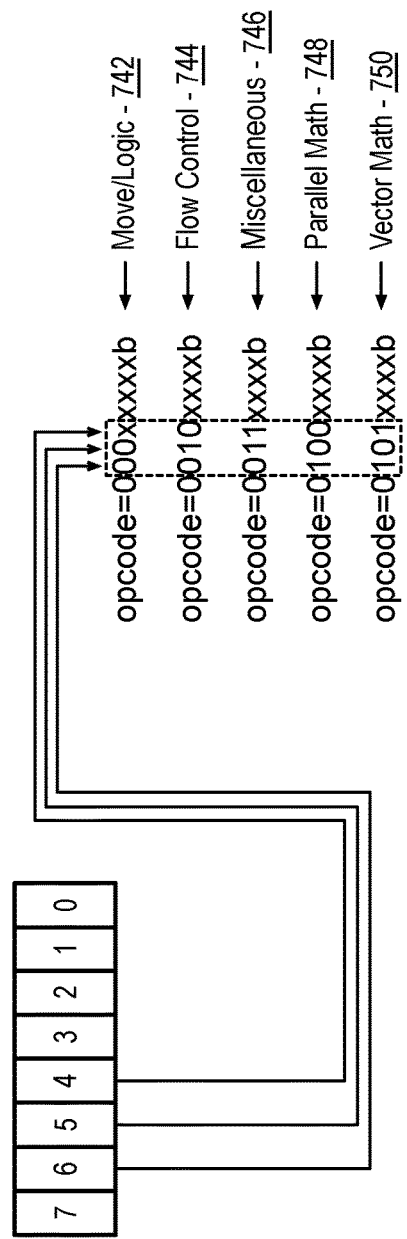

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
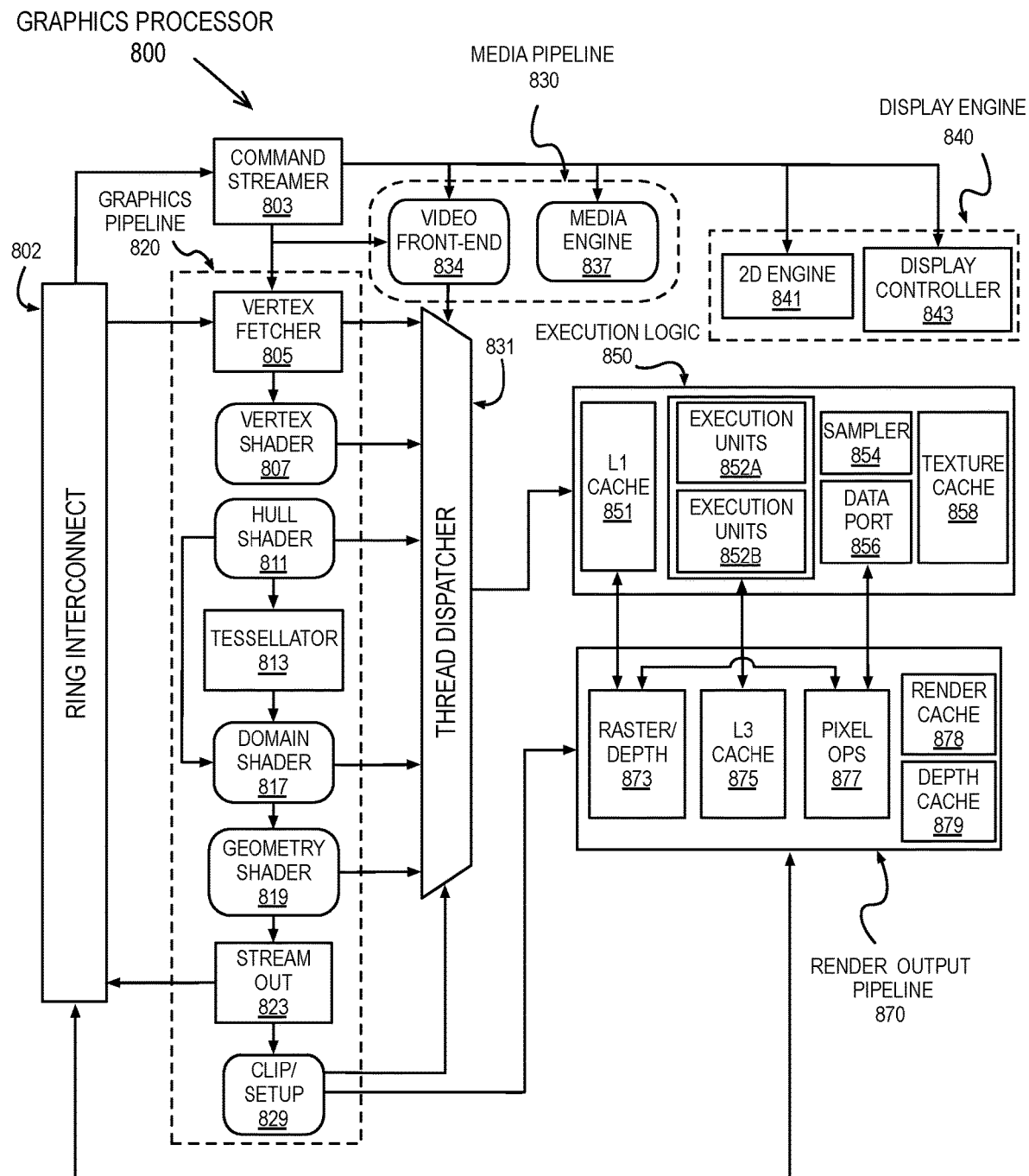
FIG. 8 is a block diagram of another embodiment of a graphics processor which includes a graphics pipeline, a media pipeline, a display engine, thread execution logic, and a rondor output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass rasterization and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 8526 each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figures 9A, 9B:
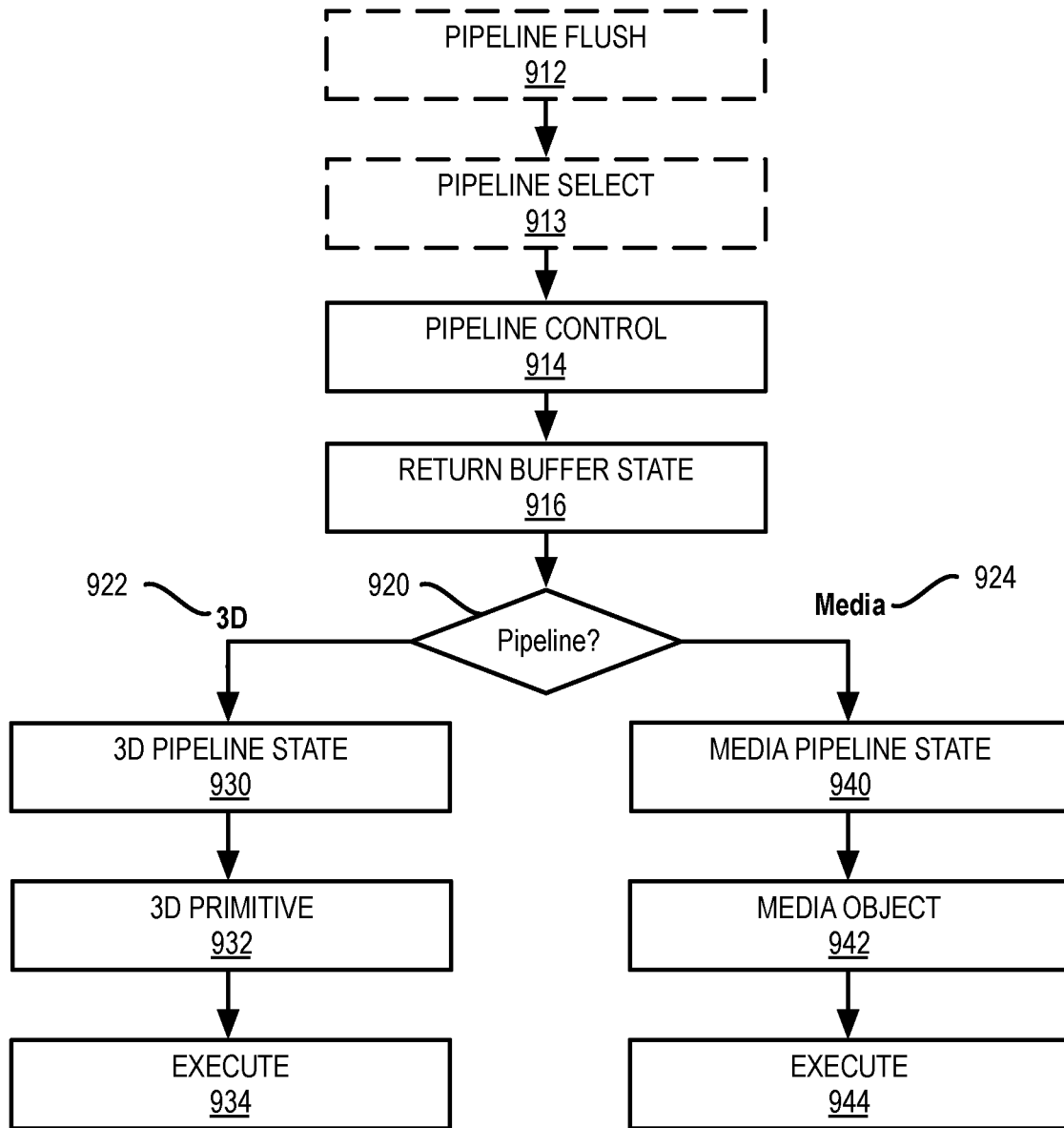
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
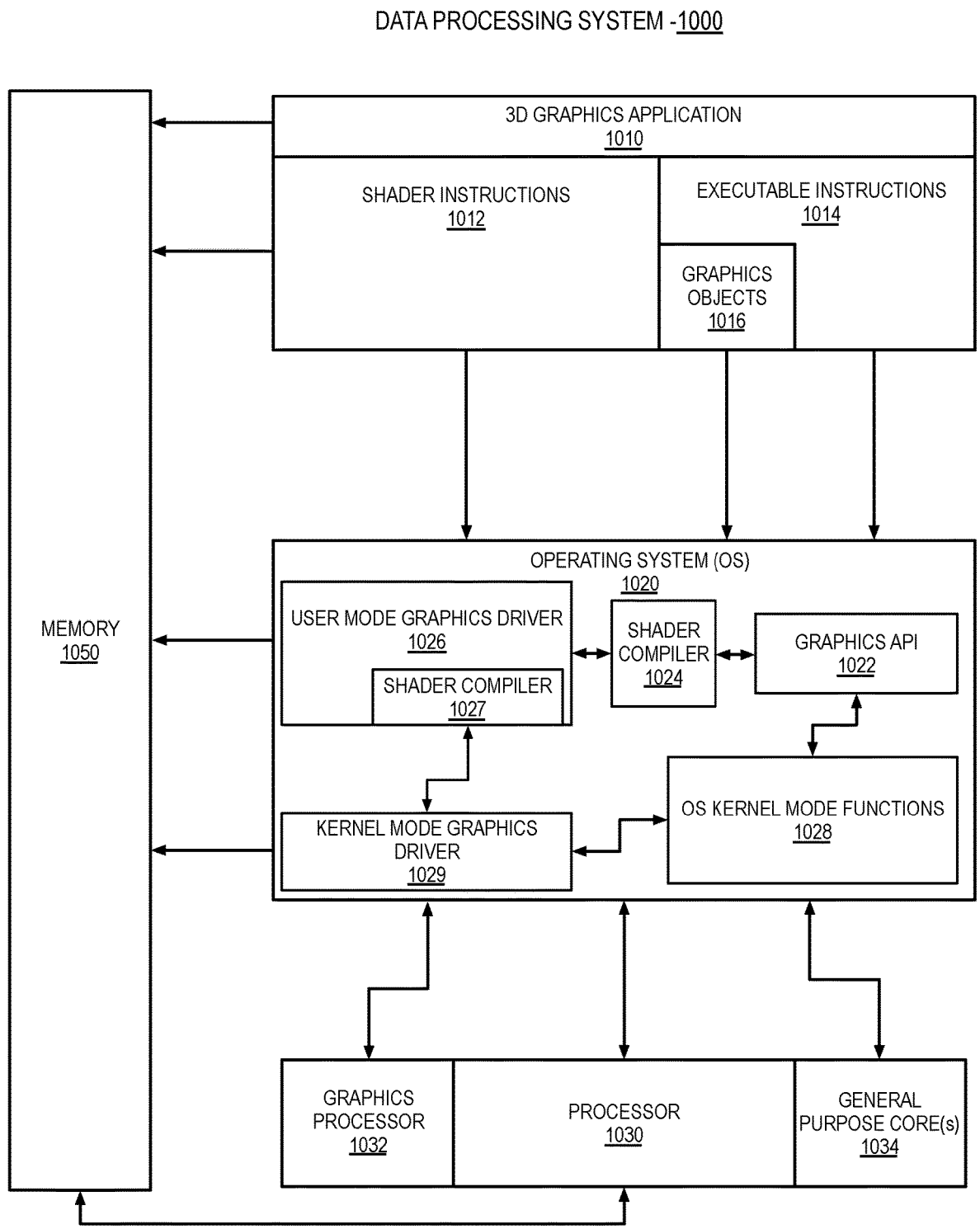
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
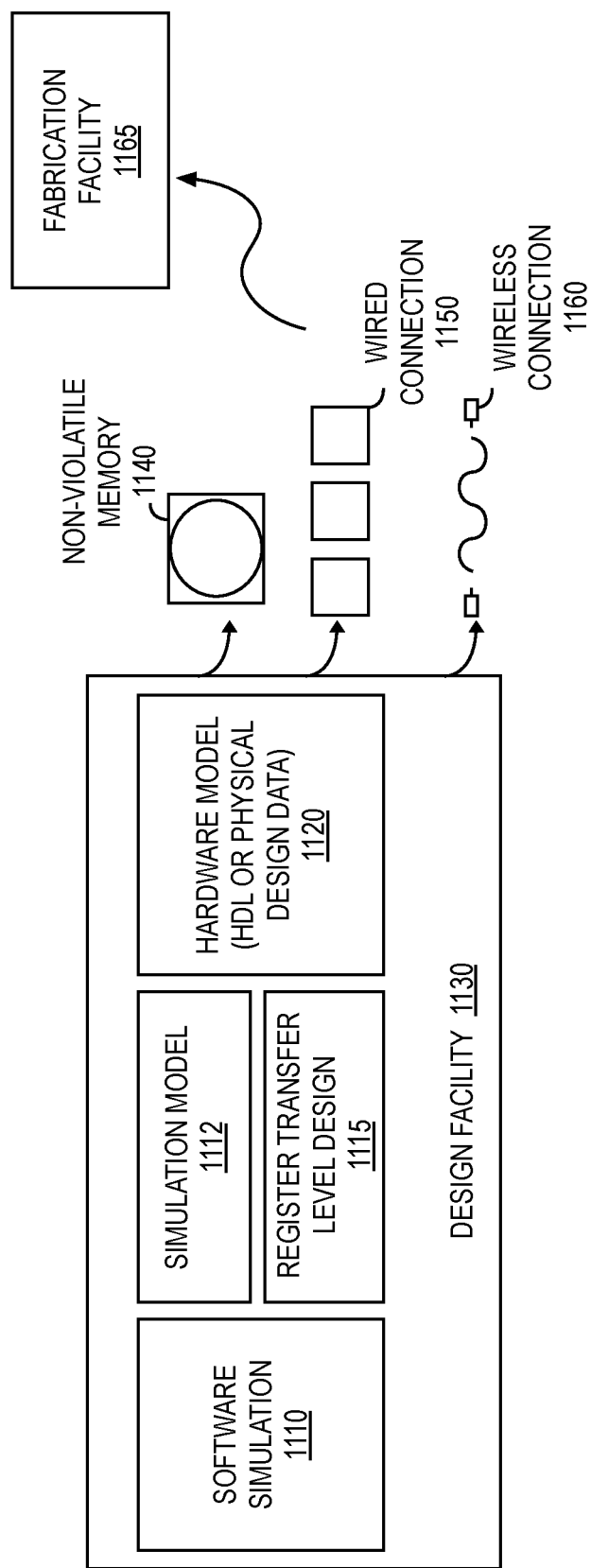
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
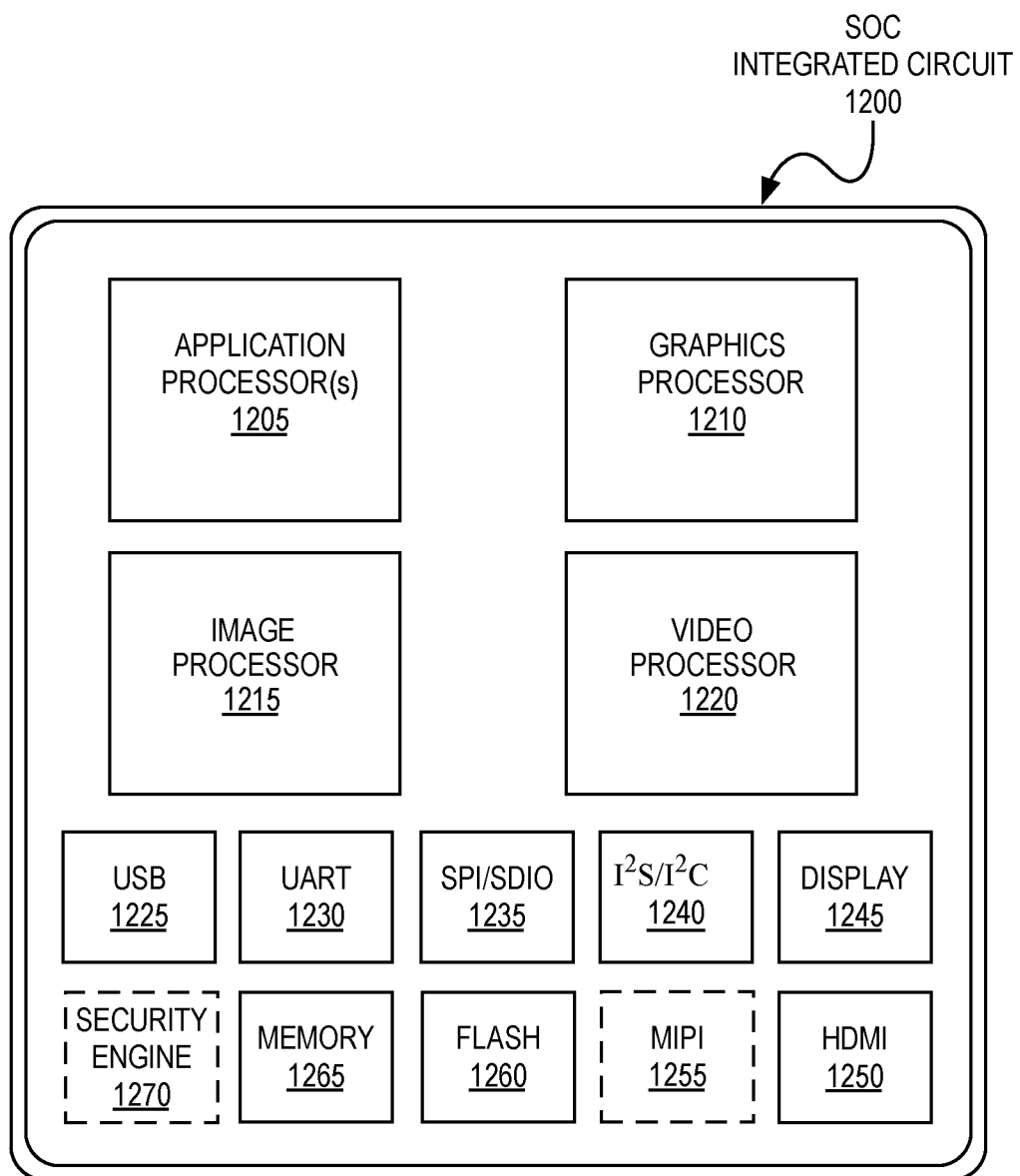
FIG. 12 is a block diagram illustrating an exemplary system on a chip integrated circuit that may be fabricated using one or more IP cores, according to an embodiment.
Figure 13:
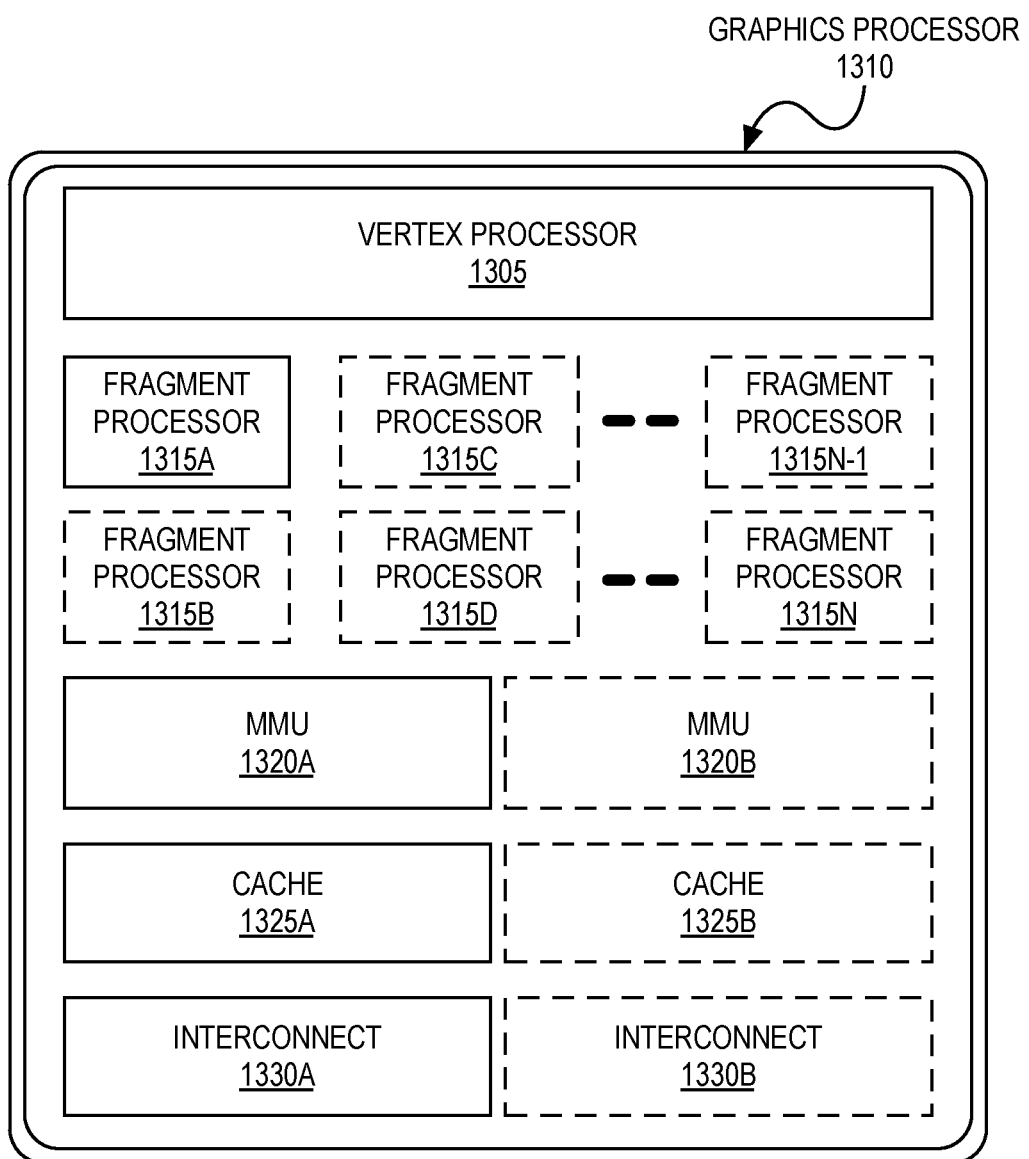
FIG. 13 is a block diagram illustrating an exemplary graphics processor of a system on a chip integrated circuit.
Figure 14:
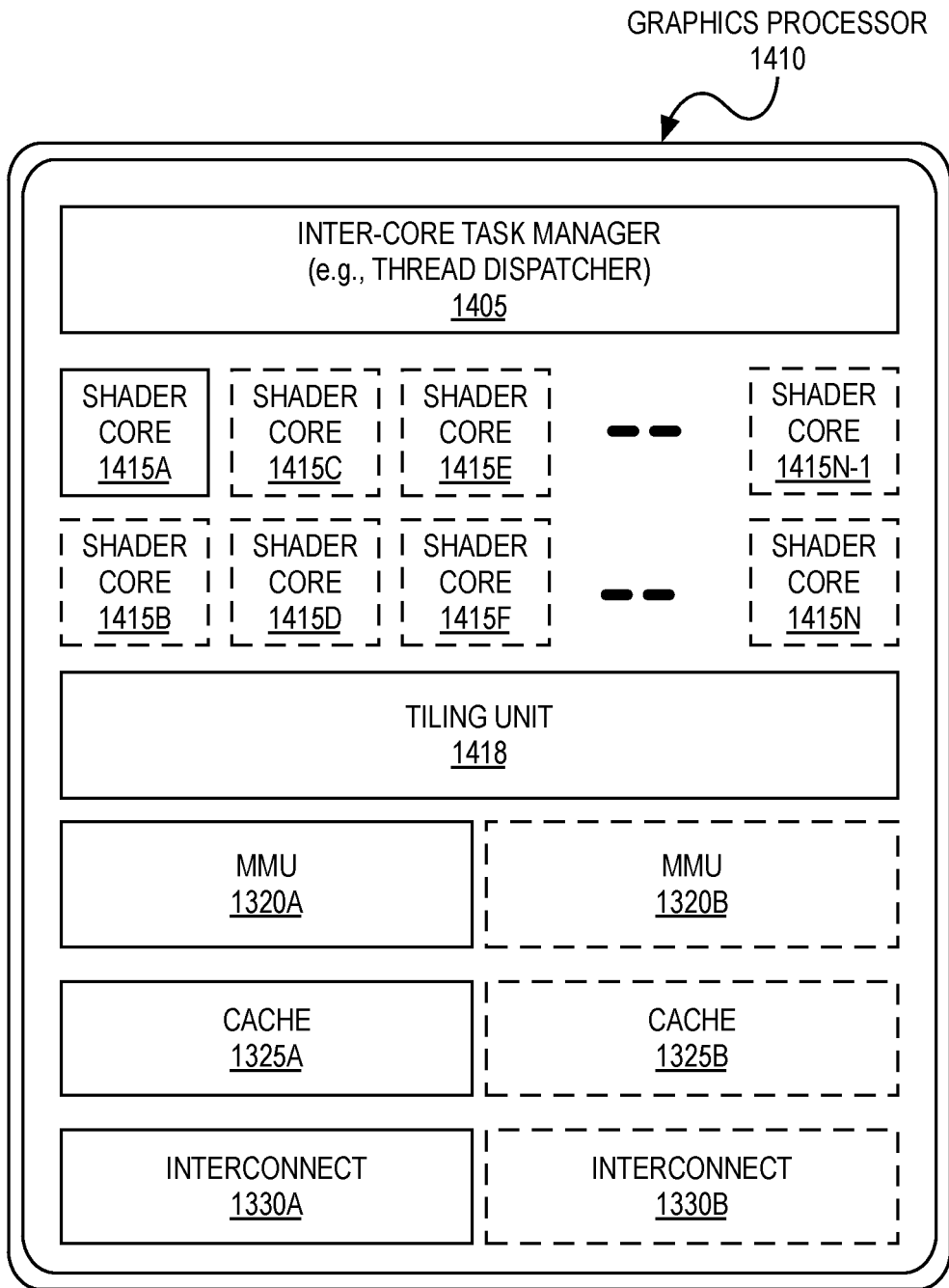
FIG. 14 is a block diagram illustrating an additional exemplary graphics processor of a system on a chip integrated circuit.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A 1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N. Graphics processor 1410 additionally includes a tiling unit 1418 to accelerate tiling operations for tile-based rendering, in which rendering operations for a scene are subdivided in image space. Tile-based rendering can be used to exploit local spatial coherence within a scene or to optimize use of internal caches.

Priming Hierarchical Depth Logic within a Graphics Processor

Embodiments described herein combine CPU or vector processor based software occlusion culling algorithms with hardware hierarchical depth implementations to enable an efficient implementation of heterogeneous hierarchical depth processing. In one embodiment a vector processor such as a SIMD enabled central processing unit or vector co-processor performs a first occlusion culling pass using a masked software occlusion culling algorithm. The hierarchical depth unit (also referred to as a hierarchical-Z unit) of the graphics processor is then primed with depth data generated during the software occlusion culling pass, enabling the hierarchical depth unit of the graphics processor to perform additional depth culling for the frame without requiring the re-generation of hierarchical depth data.

While there are existing proposals that attempt to re-project depth information from a previous frame, such techniques are functional only if movement between frames is moderate. Additionally, heuristics are still required to fill in any holes that exist due to missing data. Instead, the embodiments described herein combine the processing power of multiple processors, and can be particularly effective when implemented in a heterogeneous processing system including shared memory. However, shared memory is not required and embodiments may be implemented using one or more discrete processing nodes (e.g., discreet GPUs or many integrated core processors).

Masked Hierarchical Depth Culling for Graphics Hardware

One aspect of the embodiments described herein includes graphics processing logic configured to perform masked hierarchical depth culling. One embodiment provides for hierarchical depth culling logic that makes use of a layered depth representation, with a per-sample or per-pixel mask indicating which layer to which each sample or pixel belongs. The logic makes use of a feed forward algorithm, in contrast to existing hierarchical depth unit implementations that make use of a delayed feedback loop.

Figure 15:
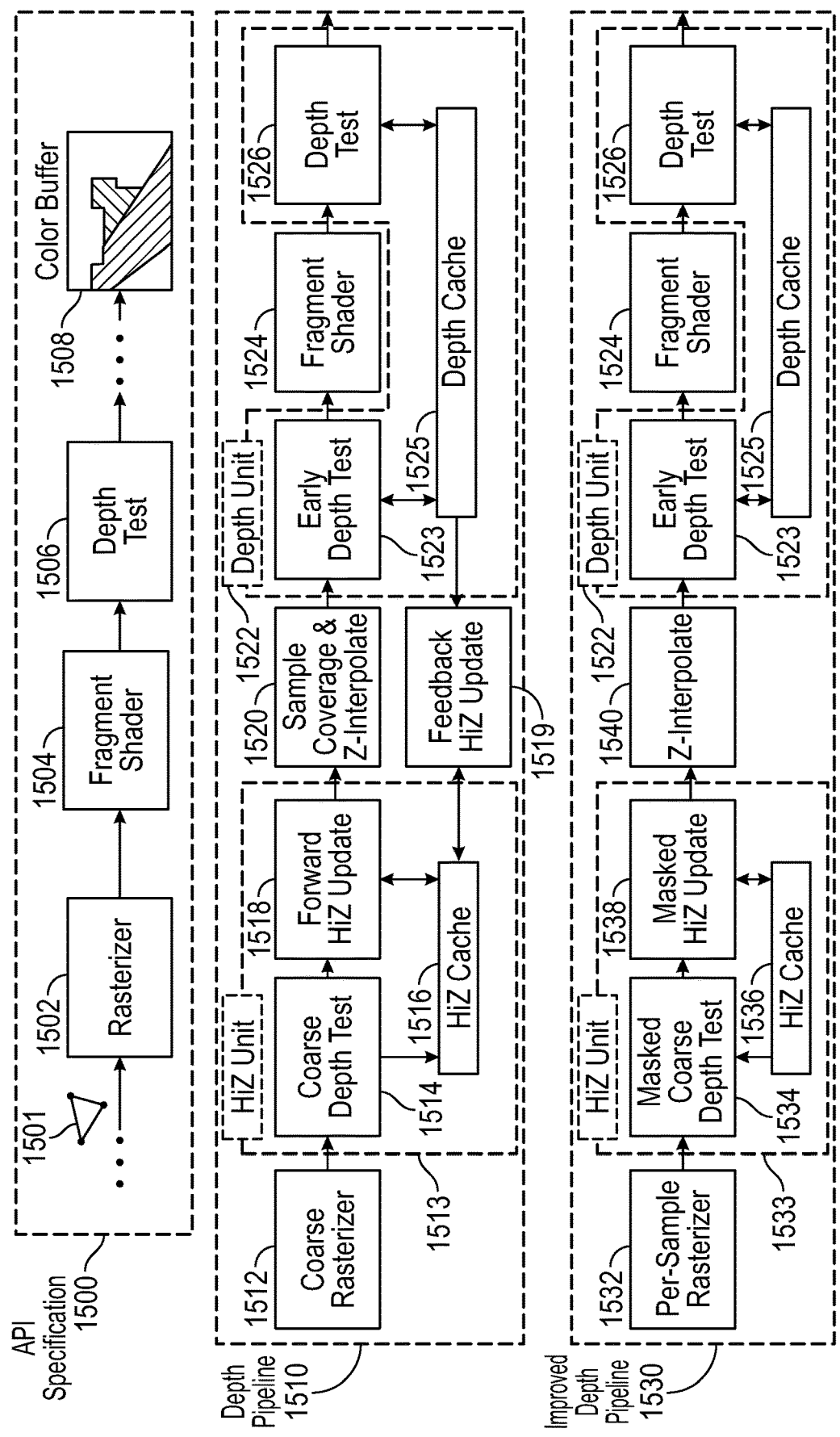
FIG. 15 is a set of block diagrams illustrating differing implementations of a rasterization pipeline, according to some embodiments.

FIG. 15 is a set of block diagrams illustrating differing implementations of a rasterization pipeline, according to some embodiments. A representation of a 3D API specification 1500 shows a simplified overview of a rasterizer 1502, fragment shader 1504, and depth test unit 1506. Depth and color buffers are progressively updated as a sequence of triangles 1501 is processed via the rendering pipeline. The sequence of triangles 1501 is rasterized by the rasterizer 1502, shaded by the fragment shader 1504, and culled by the depth test unit 1506 before being written to a color buffer 1508. For each sample, the depth of the closest triangle is stored along with its color, under the assumption that a "less than" depth test is used. For a person skilled in the art, this can be generalized to any depth test. The representation of these units is consistent with the OpenGL and DirectX API specifications, although in some implementations the fragment shader 1504 is referred to as a pixel shader.

The actual hardware pipeline may differ from the pipeline of the API specification 1500 for performance reasons, and a common implementation of a hardware depth pipeline 1510 is also shown in FIG. 15. The hardware pipeline 1510 includes a coarse rasterizer 1512 coupled with a Hierarchical-Z (Hi-Z) unit 1513. The coarse rasterizer 1512 is responsible for determining which samples overlap a particular triangle, and works on the granularity of a tile, which is a group of W×H×D samples, where W and H are the width and the height of the tile and D is the number of samples per pixel. A conservative test is performed for each tile to determine if the tile is fully covered, if the tile is entirely outside of the triangle, or if the tile partially overlaps the triangle. Per-sample coverage testing is only required for tiles partially overlapping the triangle. One possible optimization is to place the per-sample coverage test unit 1520 after Hi-Z unit 1513, as Hi-Z unit 1513 may remove or cull tiles before the per-sample coverage test occurs, which may improve the performance of the per-sample coverage test unit 1520.

Hi-Z unit 1513 is configured to quickly discard (e.g., cull) or accept tiles using a coarse depth test at a coarse depth test unit 1514. The coarse depth test unit 1514 accepts or rejects tiles whenever the outcome of the depth test can be unambiguously determined for the entire group of samples. For this purpose, Hi-Z unit 1513 maintains a conservative version of the depth buffer, generally referred to as the coarse depth buffer, which contains per-tile depth bounds in the form of a Zmin and Zmax. During operation, the coarse depth buffer can be stored in Hi-Z cache 1516. When a tile reaches Hi-Z unit 1513, conservative bounds are computed for the depth of the incoming triangle within the tile and the coarse depth test unit 1514 tests the bounds against the coarse depth buffer. The coarse depth test unit 1514 can determine whether the incoming triangle for a tile passes, fails, or is ambiguous. Failing tiles are culled. Passing and ambiguous tiles are sent down the pipeline for further processing.

As rendering progresses, the coarse depth buffer is continually updated in Hi-Z cache 1516. Zmin and Zmax for a tile can be updated separately using the forward Hi-Z update module 1518 and the feedback Hi-Z update module 1519. The forward Hi-Z update module 1518 can compute the Zmin for a tile as the minimum of Zmin for the tile and Zmin for the triangle. Zmax for the tile can be updated via the feedback Hi-Z update module 1519. A max-reduction on an entire tile of depth samples is performed in depth unit 1522 and the result can be sent back to Hi-Z unit 1513 through the feedback mechanism.

Depth unit 1522 typically works on tiles of samples by testing each sample individually against a value stored in a per-sample depth buffer. Depth unit 1522 can include a depth cache 1525. The size of a tile can be correlated to a cache line in depth cache 1525. The size of the cache line is determined by how much data can be efficiently streamed to and from memory. Thus, the feedback mechanism of the feedback Hi-Z update module 1519 can impose a constraint between the tile sizes of Hi-Z unit 1513 and depth unit 1522, such that the max-reduction operation is performed on the granularity of the tiles in the Hi-Z buffer, constraining the tile sizes of the coarse depth buffer and the regular depth buffer to be the same.

One optimization that may be integrated into depth unit 1522 is an early depth test module 1523, which, when enabled, performs per-sample depth testing before fragment shading, which reduces the work requirements of the fragment shader 1524. Output from the fragment shader 1524 can be processed by the depth test module 1526, consistent with the depth test 1506 portion of the API specification 1500.

While the illustrated depth pipeline 1510 enables high performance depth operations on a sequence of triangles 1501, some embodiments described herein include an improved depth pipeline 1530 that can approach the best case performance of the illustrated depth pipeline 1510 while significantly reducing the total operational bandwidth requirements. The improved depth pipeline 1530 provides a mechanism to update the coarse depth buffer using only forward updates, removing the need for a feedback mechanism. In one embodiment, such updates can be performed in a streaming fashion using information about the current triangle, without the use of a triangle buffering or render history.

The improved depth pipeline 1530 includes a per-sample rasterizer 1532 coupled with an updated Hi-Z unit 1533 including a masked coarse depth test module 1534, a masked Hi-Z update module 1538, and a Hi-Z cache 1536. Hi-Z unit 1533 is generally configured to confine as much depth processing communication as possible within the Hi-Z unit 1533. Portions of the improved depth pipeline 1530 beyond Hi-Z unit 1533, such as the depth unit 1522, may be similar to the conventional depth pipeline 1510. However, in one embodiment a z-interpolation module 1540 may be used that does not perform per-sample coverage determination.

A specific Hi-Z representation can be used to improve the degree to which the depth processing can be confined to the Hi-Z unit. In this representation, two Zmax-values (e.g., Zmax0 and Zmax1) are used, in combination with a one bit per sample (or pixel for 1×MSAA) mask to indicate whether a sample or pixel is associated with Zmax0 or Zmax1. Embodiments can also provide support for more than 2 layers.

In one embodiment, the per-sample rasterizer 1532 provides a triangle and an associated coverage mask to the masked coarse depth test module 1534, which computes a Zmin and Zmax for the triangle. An interval overlap test between the triangle Zmin and Zmax and the Zmin and Zmax for each layer is performed. Aggregate per-sample pass and fail masks can be constructed from the triangle's coverage mask and the selection mask using simple bitwise operations. The exact depth test is only required for the samples that are not present in either of the pass or fail masks. Exemplary Pseudo-code for how the coarse depth test is performed for a 'less-than' test is given in Listing 1 below:

Listing 1: Perform coarse depth test

```
function coarseZTest(tile, tri)
    failMask0 = tri.zMin >= tile.zMax[0]
        ? tri.rastMask & ~tile.mask : 0
    failMask1 = tri.zMin >= tile.zMax[1]
        ? tri.rastMask & tile.mask : 0
    failMask = failMask0 | failMask1
    passMask = tri.zMax < tile.zMin ? tri.rastMask : 0
    return [passMask, failMask]
```

An alternative version of the coarse test may be performed before the per-sample coverage test. This alternate version is shown in Listing 2 below. In contrast to the coarse test version shown in Listing 1, the alternative version of the test does not account for coverage. However, the cull rate generated by the alternative version is generally acceptable relative to the coarse test of listing 1 above.

Listing 2: Perform coarse depth test without coverage mask

```
function coarseZTest_noMask(tile, tri)
    if tile.mask == 0:
        maxOfMax = tile.zMax[0]
```

-continued

Listing 2: Perform coarse depth test without coverage mask

```
    else if tile.mask ==~0:
        maxOfMax = tile.zMax[1]
    else:
        maxOfMax = max(tile.zMax[0] , tile.zMax[1])
    fail = tri.zMin >= maxOfMax
    pass = tri.zMax < tile.zMin
    return [pass, fail]
```

Unless all samples were culled by the masked coarse depth test module 1534, the masked Hi-Z update module 1538 updates the coarse depth buffer. The coarse depth buffer, stored in Hi-Z cache 1536, is updated in a manner that the coarse depth buffer conservatively bounds the contents of the depth buffer. The Zmin value can be updated in the same manner in which the forward Hi-Z update module 1518 updates the Zmin value, in which Zmin for a tile is the minimum of Zmin for the tile and Zmin for the triangle. To update the Zmax values and the selection mask data in the Hi-Z buffer, the three depth layers represented by Zmax0, Zmax1, and the triangle are merged into two layers.

The merge can be performed as follows. First, consider a single sample, S, which belongs to layer i and is also found to be overlapping the incoming triangle. Using a less than depth test, it is known that the depth of S after the depth test will be at most the minimum (closer) value of Zmax of layer i and Zmax of the triangle. A determination can then be performed to determine which layer to which a sample belongs, either to the previously assigned layer or to the layer of the incoming triangle. Then, three non-overlapping sample masks can be generated, signaling which of the three layers Zmax0, Zmax1, and Zmax triangle to which each sample belongs. After categorizing the samples, if there are any layers that do not have associated samples (e.g., the sample mask is empty for a layer), the two remaining layers can be written to the coarse depth buffer. It there are samples in all three layers, a simple distance-based heuristic can be used to select which layers should be merged, with the underlying assumption being that triangles that have similar depth values are likely to be part of the same surface. Distances between all of the layers can be computed and the shortest distance can be used to determine which merge operation is performed. The sample masks of the two closest layers are also merged using bitwise operations to produce the new selection mask. Exemplary Pseudo-code for the update and merge functions can be found in Listing 3 and Listing 4.

Listing 3: Update coarse depth buffer

```
function coarseZUpdate(tile, tri)
    triMask0 = tri.zMax < tile.zMax[0]
        ? tri.rastMask &~tile.mask : 0
    triMask1 = tri.zMax < tile.zMax[1]
        ? tri.rastMask & tile.mask : 0
    triMask = triMask0 | triMask1
    layer0Mask = ~tile.mask & ~triMask
    layer1Mask = tile.mask & ~triMask
    if triMask !=0;
        if layer0Mask == 0:
            // Layer 0 is empty and is replaced
            tile.zMax[0] = tri.zMax
            tile.mask = ~triMask
        else if layer1Mask ==0:
            // Layer 1 is empty and is replaced
            tile.zMax[1] = tri.zMax
            tile.mask = triMask
```

Listing 3: Update coarse depth buffer

```
    else :
        // All layers contain samples, merge
        merge (tile, tri, triMask)
```

Listing 3 shows that the coarse buffer is trivially updated if any of the layers are overwritten. However, a heuristic-based merge function is called to resolve complicated multi layered situations. The merge function shown in Listing 4 reduces three layers to two and updates the selection mask.

Listing 4: Merging Heuristic

```
function mergeClosest(tile, tri, triMask)
    dist0 = abs(tri.zMax tile.zMax[0])
    dist1 = abs(tri.zMax tile.zMax[1])
    dist2 = abs(tile.zMax[0] tile.zMax[1])
    if dist0 < dist1 && dist0 < dist2 :
        // Merge triangle layer with layer 0
        tile.zMax[0] = max(tile.zMax[0] , tri.zMax)
        tile.mask = tile.mask &~triMask
    else if dist1 < dist2:
        // Merge triangle layer with layer 1
        tile.zMax[1] = max(tile.zMax[1] , tri.zMax)
        tile . mask = tile . mask | triMask
    else :
        // Merge layer 0 and 1
        tile.zMax[0] = max(tile.zMax[0] , tile.zMax[1])
        tile.zMax[1] = tri.zMax
        tile.mask = triMask
```

While the less than depth function is illustrated, embodiments are not limited to a specific depth function. One embodiment is configured to support the greater than depth function. For the greater than depth functions, tiles are represented by two Zmin values and one Zmax value. A single bit is stored for each coarse depth buffer tile indicating which representation is currently in use. If the tile does not match the current depth function, the tile can be converted before the coarse depth buffer is updated. Conversion can be performed by conservatively swapping the min and max values.

Masked Software Occlusion Culling

One aspect of the embodiments described herein include processing logic configured to perform an algorithm for perform masked software occlusion culling. The masked software occlusion culling algorithm implements many aspects of the Zmax mask Hi-Z unit logic in software optimized to use SIMD or SIMT instructions provided by a general purpose or special purpose processor. Exemplary instructions include but are not limited to those provided by one or more versions of the advanced vector extensions (AVX) to the x86 ISA, although these techniques are not limited to any particular ISA. For example, embodiments may be implemented using software optimized for execution on the MIPS® SIMD architecture or that use AKM® NEON instructions.

In one embodiment, the occlusion culling logic is divided into two main passes. The first pass identifies a set of significant, large occlude meshes, performs basic view frustum and back face culling, and then transforms & rasterizes all non-culled triangles to a full-resolution depth buffer. The depth buffer is then reduced by computing the maximum depth for each pixel tile, which creates a one-level hierarchical depth buffer. The second pass performs occlusion queries in software to determine which objects are visible. The bounding box of each potential occluded is view frustum culled and then transformed to screen space to form a bounding rectangle with a minimum depth, Zbox-min. The occlusion query can be performed by traversing the bounding rectangle and testing the minimum depth, Zbox-min, against the relevant depths stored in the hierarchical depth buffer, Ztile-max. The object is then classified as occluded if Zbox-min is greater than Ztile-max. In one embodiment, all operations of the second pass need not be performed if the software occlusion culling operations are to be performed in conjunction with rendering operations on a GPU. Instead, only the Hi-Z data used to perform the occlusion queries are performed.

In one embodiment the software occlusion algorithm is configured to perform masked software occlusion culling. To create the coverage mask, each edge of a geometric primitive (e.g., triangle) is processed. An exemplary implementation uses 8-wide SIMD with 32 bits per register, per lane, enabling the parallel processing of an 8×32 tile of pixels. The precise tile size supported by embodiments may vary based on the underlying processing capabilities of the processor or supported ISA. While one embodiment is configured to process 8×32 tiles of pixels, larger or smaller tile sizes may be supported. For the purposes of discussion, an 8×8 pixel tile will be described and illustrated as an example.

Figure 16:
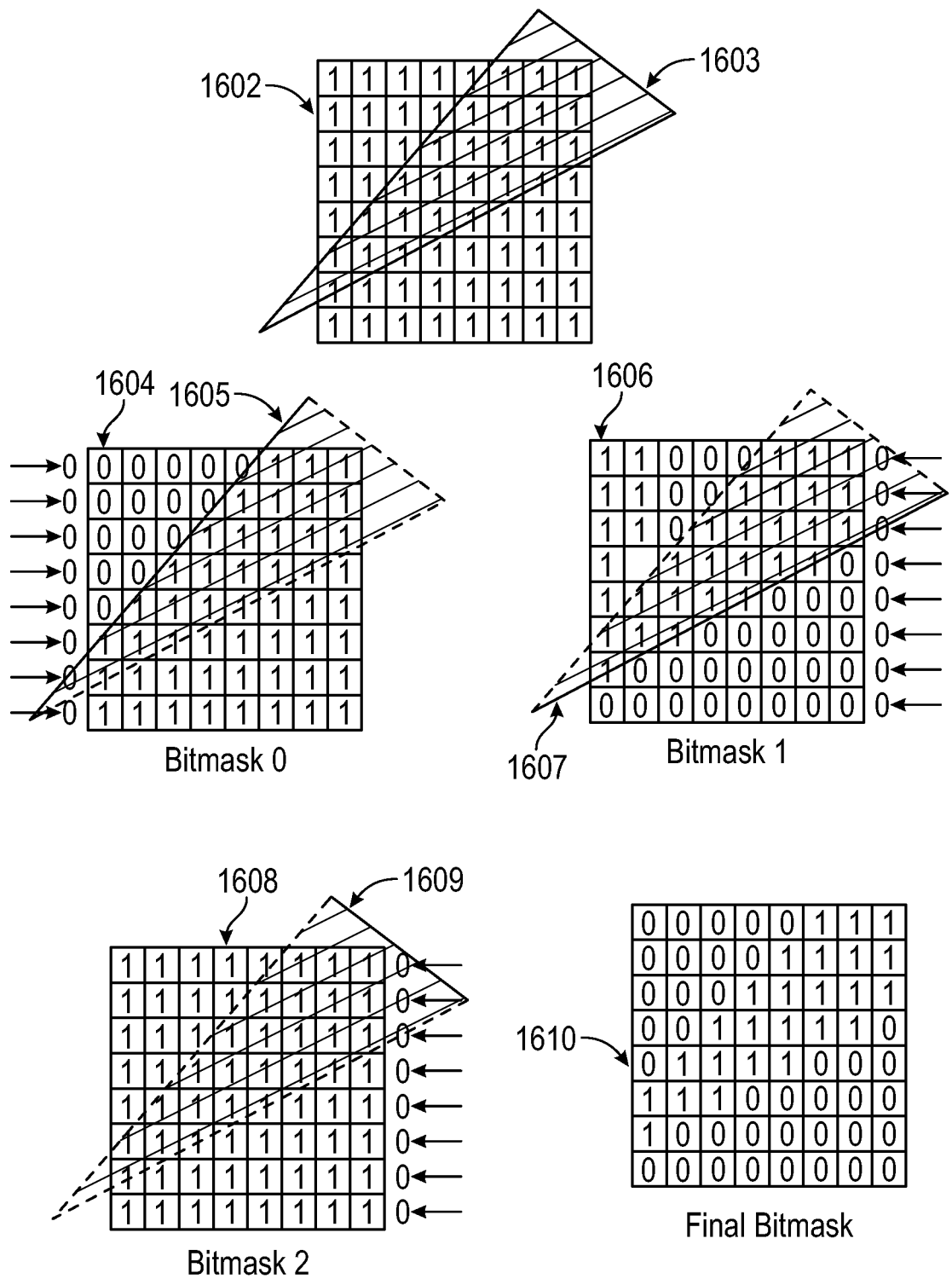
FIG. 16 illustrates exemplary bitmasks generated by the masked software occlusion culling, according to an embodiment.

FIG. 16 illustrates exemplary bitmasks generated by the masked software occlusion culling, according to an embodiment. An 8×8 pixel tile 1602 is illustrated as covered by a triangle primitive 1603. In one embodiment each bit of the tile is initialized to one (e.g., 0b1). Zeroes are then shifted in from the edge of each tile until the edge of the primitive is met, which creates a bitmask for each edge. The bitmasks generated for each edge of the primitive are combined via a bitwise AND to produce a final coverage bitmask.

For example, a zeroth bitmask 1604 (bitmask 0) can be generated by shifting zeros from the left side of the tile 1602 until a first edge 1605 is reached. A first bitmask 1606 (bitmask 1) can be generated by shifting zeros from the right side of the tile 1602 until a second edge 1607 is reached. A second bitmask 1608 (bitmask 2) can be generated by shifting zeros from the right side of the tile 1602 until a third edge 1609 is reached. However, in the illustrated case, the third edge is off the tile, so no zero bits are set for the second bitmask 1608. The bitmasks generated for each edge of the primitive are combined via a bitwise AND to produce a final bitmask 1610, which is the coverage bitmask. A conservative depth of the primitive is computed and merged with the Hi-Z record for the tile. This is one way to compute coverage. Other methods are possible as well.

The software based merge heuristic used to merge the primitive depth with the Hi-Z record is similar to the heuristic described with respect to the masked hierarchical depth culling logic designed for implementation via graphics Hardware, for which exemplary pseudo code is shown in Listing 4 above. In one embodiment, a CPU optimized merge heuristic is used. In general, various optimizations of the masked software occlusion culling logic may be performed based on the host processor or processing system upon which the software occlusion culling logic will be executed, including optimizations that make use of a shared memory system between the GPU and CPU or other processors.

Priming Hierarchical Depth Logic within a Graphics Processor

The Hi-Z data generated during software occlusion culling for a scene via a CPU can be used to prime the hierarchical depth logic on a graphics processor within a GPU. Priming the hierarchical depth logic of the graphics processor includes configuring the hierarchical depth unit to read hierarchical depth data from a hierarchical depth buffer generated by the software occlusion culling logic for a scene without generating separate hierarchical depth data based on a rasterization of the scene. Using this method, the graphics processor can use the Hi-Z buffer data for a frame which is provided beforehand by way of software occlusion culling, instead of having to compute any per-pixel/per-sample depths. Furthermore, the rasterizer unit (e.g., per sample rasterizer 1532 of FIG. 15) of the graphics processor can avoid rasterizing fully occluded objects via an occlusion query and/or hierarchical depth testing to the Hi-Z unit. In one embodiment, the Hi-Z buffer data is further refined and updated by the Hi-Z unit, although further processing of the Hi-L butter may be bypassed.

In conventional graphics processor having a Hi-Z unit, the Hi-Z data for the previous scene is cleared before operating on a subsequent scene. Instead, the graphics processor can use the Hi-Z data generated during the software occlusion culling operations for the scene to prime an internal Hi-Z unit (e.g., Hi-Z unit 1533 as in FIG. 15). The scene can then be rendered using the graphics processor, the graphics processor having been primed by the Hi-Z data. The rendering performance of the graphics processor is then increased due to the provided Hi-Z data. First, the graphics processor will not have to render a Hi-Z buffer to determine depth data, as the Hi-Z buffer data for the scene is provided beforehand. A rasterizer (e.g., per sample rasterizer 1532 of FIG. 15) via an occlusion query and/or hierarchical depth testing to the Hi-Z unit, can then bypass initial rasterization of objects that are fully occluded.

Figure 17:
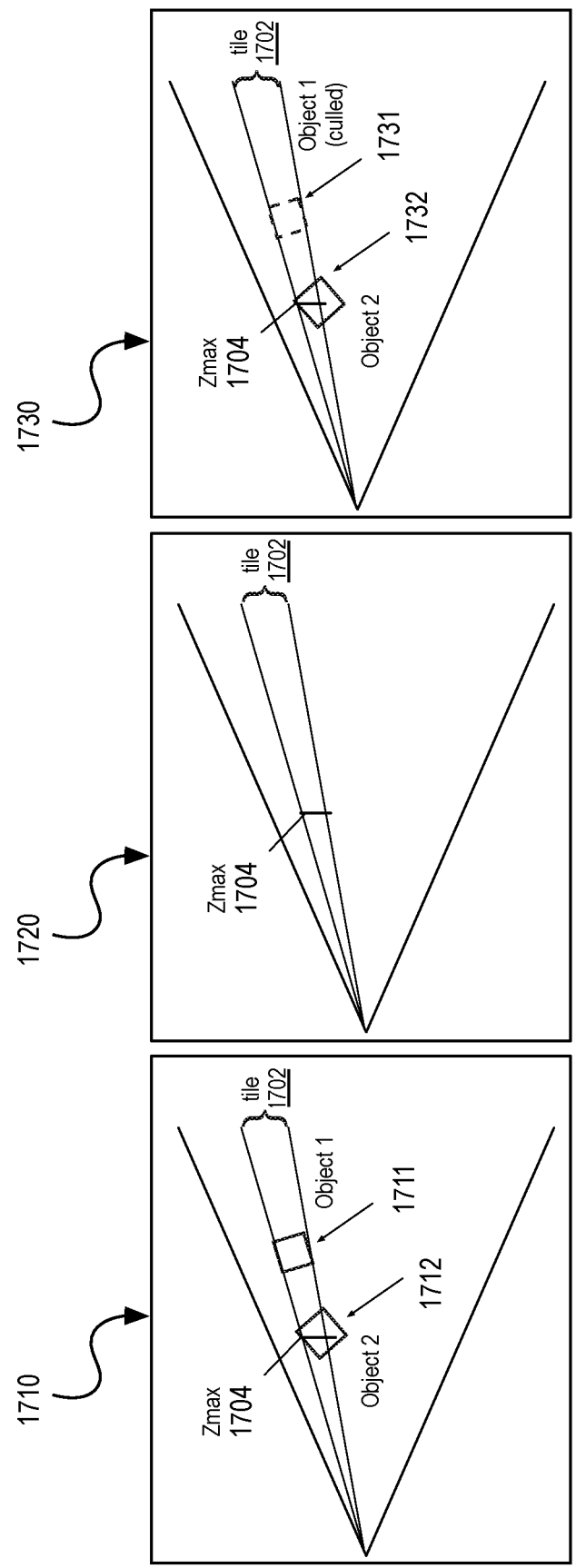
FIG. 17 illustrates a rendering process using a primed hierarchical depth unit, according to an embodiment.

FIG. 17 illustrates a rendering process using a primed hierarchical depth unit, according to an embodiment. A first set of scene data 1710 is shown, in which a tile 1702 of the scene includes a first object 1711 (object 1) and a second object 1712 (object 2). Operations for a single tile (e.g., tile 1702) will be described, although the same procedures are generally applied to all tiles in the scene.

Software occlusion culling is performed using the first set of scene data 1710, during which a conservative depth representation for the tile is generated. The illustrated depth representation is a Zmax-mask (Zmax 1704) representation, but can vary based on the software occlusion culling algorithm. For example a min-max representation may also be used, although the Zmax-mask representation may yield higher performance when performing occlusion culling in software. The representation should be conservative with regards to the full resolution depth buffer in order to assure that the hierarchical testing always yields a correct result.

Once software occlusion culling is finished, the Hi-Z data stored in the hierarchical depth buffer can be made available to the GPU. This data can be shared with an internal GPU via shared memory, or may be transferred over an I/O or interface bus to a discrete GPU. As illustrated by the second set of scene data 1720, the GPU data for the scene can be initialized using the depth data the tile 1702. For example, Zmax-mask (Zmax 1704) data can be used to initialize a Hi-Z buffer used by the Hi-Z unit of the graphics processor before the scene is rendered, instead of clearing the Hi-Z buffer generated by the previous scene. The Hi-Z unit can then further refine the Hi-Z data for the scene or can rely entirely on the Hi-Z data generated by the software occlusion culling operations.

As an alternative to sharing the Hi-Z buffer with the GPU or copying the Hi-Z buffer data to the GPU over an I/O bus, the CPU (e.g., via a graphics driver) can render a tile-sized quad to each tile, where the quad covers only the tile and has a depth value corresponding to the maximum depth stored in the corresponding Hi-Z record generated by the CPU. This method may not be as efficient and may be harder to perform using the Zmax-mask Hi-Z representation, which, in some embodiments, is a more efficient representation of depth data.

If the formats of the Hi-Z records generated by the software occlusion culling algorithm are the same as the Hi-Z records used by Hi-Z unit of the graphics processor, the data may be directly shared or transferred. If the formats differ, a conversion can be performed. In various implementations and embodiments the software can convert the Hi-Z records to the format used by the graphics processor. This can be performed by the software occlusion culling logic or by a graphics driver associated with the graphics processor. Alternatively, the graphics processor can be configured to convert the Hi-Z records in hardware. In one embodiment, if a conversion is needed, the conversion logic can perform the conversion in place within the Hi-Z buffer. In one embodiment, a new Hi-Z buffer is allocated and the converted data is written to the new Hi-Z buffer. After conversion, a pointer to the Hi-Z buffer in the appropriate format can be sent to the graphics processor, either via shared memory or via a data transfer over an I/O bus. Highest performance can be realized if the Hi-Z record format used by the software occlusion culling logic is the same as the format used by the graphics processor Hi-Z unit, such that a conversion is not necessary.

When the graphics processor begins rendering the scene, a third set of scene data 1730 is generated. During rendering, the Hi-Z unit of the graphics processor has been primed using the Hi-Z data generated by the software occlusion culling logic, which means for each tile (e.g., tile 1702) the HiZ-buffer data (e.g., Zmax 1704) for the tile is already present, giving the Hi-Z unit greater "occlusion power," enabling the Hi-Z unit to perform more effective occlusion queries. In this example scene, the second object 1732 (object 2) completely occludes the first object 1731 (object 1). Thus, an occlusion query for the first object 1731 will indicate that no samples would be drawn for the first object. Thus, the first object 1731 may be entirely culled and the rasterizer may bypass rasterization of the first object 1731. In one embodiment the culling is performed by a rasterizer in concert with the Hi-Z unit during rasterization. In one embodiment the culling can also be performed by a geometry shader of a 3D graphics pipeline in concert with the Hi-Z unit or, in one embodiment, based on Hi-Z data generated from the first scene data 1710.

While subsequent depth testing, for example, an early depth test before the fragment shader may indicate that samples or pixels for the first object 1731 should not be rendered, by priming the Hi-Z unit of the graphics processor with the Hi-Z data generated by the software occlusion culling logic, objects may be culled earlier in the rendering pipeline, further reducing work performed by the graphics processor.

Hierarchical Depth Culling for Heterogeneous Processors

The depth culling operations described herein can be used to enable heterogeneous hierarchical depth culling in a heterogeneous processing system with shared memory.

Figure 18:
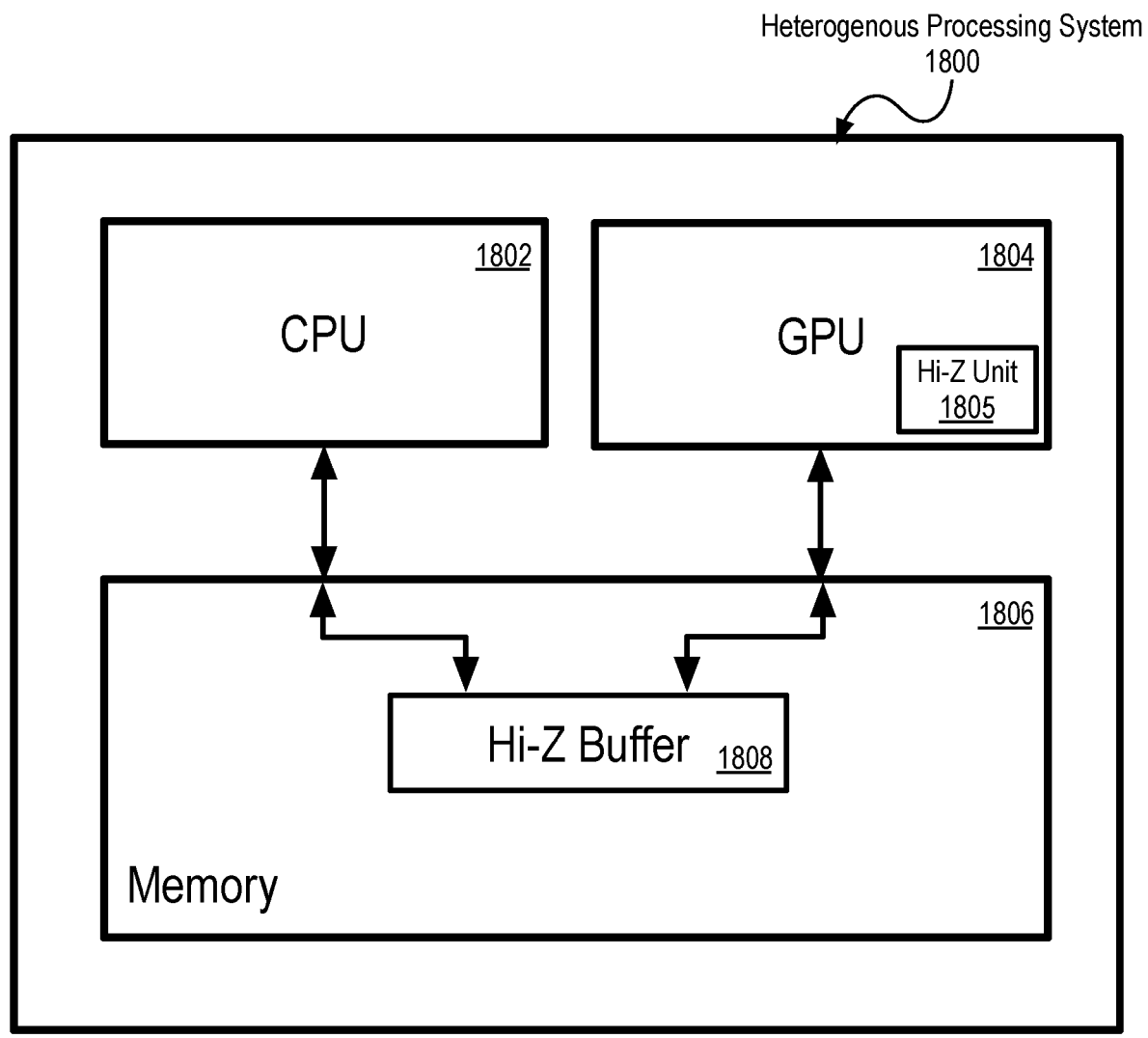
FIG. 18 is a block diagram of a heterogeneous processing system, according to an embodiment.

FIG. 18 is a block diagram of a heterogeneous processing system 1800, according to an embodiment. The heterogeneous processing system 1800 includes a CPU 1802 and a GPU 1804. In one embodiment the heterogeneous processing system 1800 is a system on a chip integrated circuit in which the CPU 1802 and GPU 1804 are on a same, single die. In one embodiment the heterogeneous processing system 1800 is a system on package integrated circuit in which the CPU 1802, GPU 1804, and memory 1806 are coupled within a single package. The CPU 1802 and the GPU 1804 each couple with a unit of memory 1806, which is shared between the CPU 1802 and the GPU 1804. The memory 1806 can store a Hi-Z buffer 1808 (also referred to as a hierarchical depth buffer) that is shared between the CPU 1802 and the GPU 1804.

The CPU may be any type of general-purpose processor suitable for operation as a primary system processor, and may be a multi-core processor that includes multiple processor cores, such as the processor core(s) 102 of FIG. 1 or core 202A-202N as in FIG. 2. The GPU 1804 includes one or more graphics processors, graphics processor cores, and/or graphics processing clusters, and may include graphics processor logic as described with respect to any of the graphics processors described herein. The GPU 1804 additionally includes a Hi-Z unit 1805, which may be any hierarchical depth unit, including but not limited to Hi-Z unit 1513 or Hi-Z unit 1533 as in FIG. 15. The Hi-Z unit 1805, can access Hi-Z data stored in the Hi-Z buffer 1808 in the memory 1806. As described herein, the Hi-Z data in the Hi-Z buffer 1808 can be based on Hi-Z data generate by software occlusion culling logic executing on the CPU 1802. In one embodiment, the software occlusion culling logic can write directly to the shared Hi-Z buffer 1808, and the Hi-Z unit 1805 of the GPU may directly read such data from the memory 1806. If updates from the Hi-Z unit 1805 are enables, the GPU can also write directly to the Hi-Z buffer in the memory 1806. In one embodiment, the data written to the shared Hi-Z buffer 1808 may be converted to a Hi-Z record format used by the HI-Z unit 1805 before the Hi-Z unit 1805 consumes the data.

The memory 1806 can be any memory that can be shared between the CPU 1802 and the GPU 1804, including shared system memory or shared local memory. For example and in one embodiment, the memory 1806 may be an embedded memory module, such as the embedded memory module 218 as in FIG. 2. In one embodiment, the memory 1806 is a portion of system memory that is directly addressable by the CPU 1802 and the GPU 1804. In such embodiment, the CPU 1802 and the GPU 1804 can access data stored in the Hi-Z buffer 1808 without requiring a memory copy between respective address spaces of the CPU 1802 and the GPU 1804.

Although the techniques described herein can be optimized for use in a heterogeneous processing system with shared memory, embodiments are not limited to such systems, and the Hi-Z unit priming techniques can be utilized on various types of processing systems, including systems with discrete GPUs and/or parallel processors.

Figure 19:
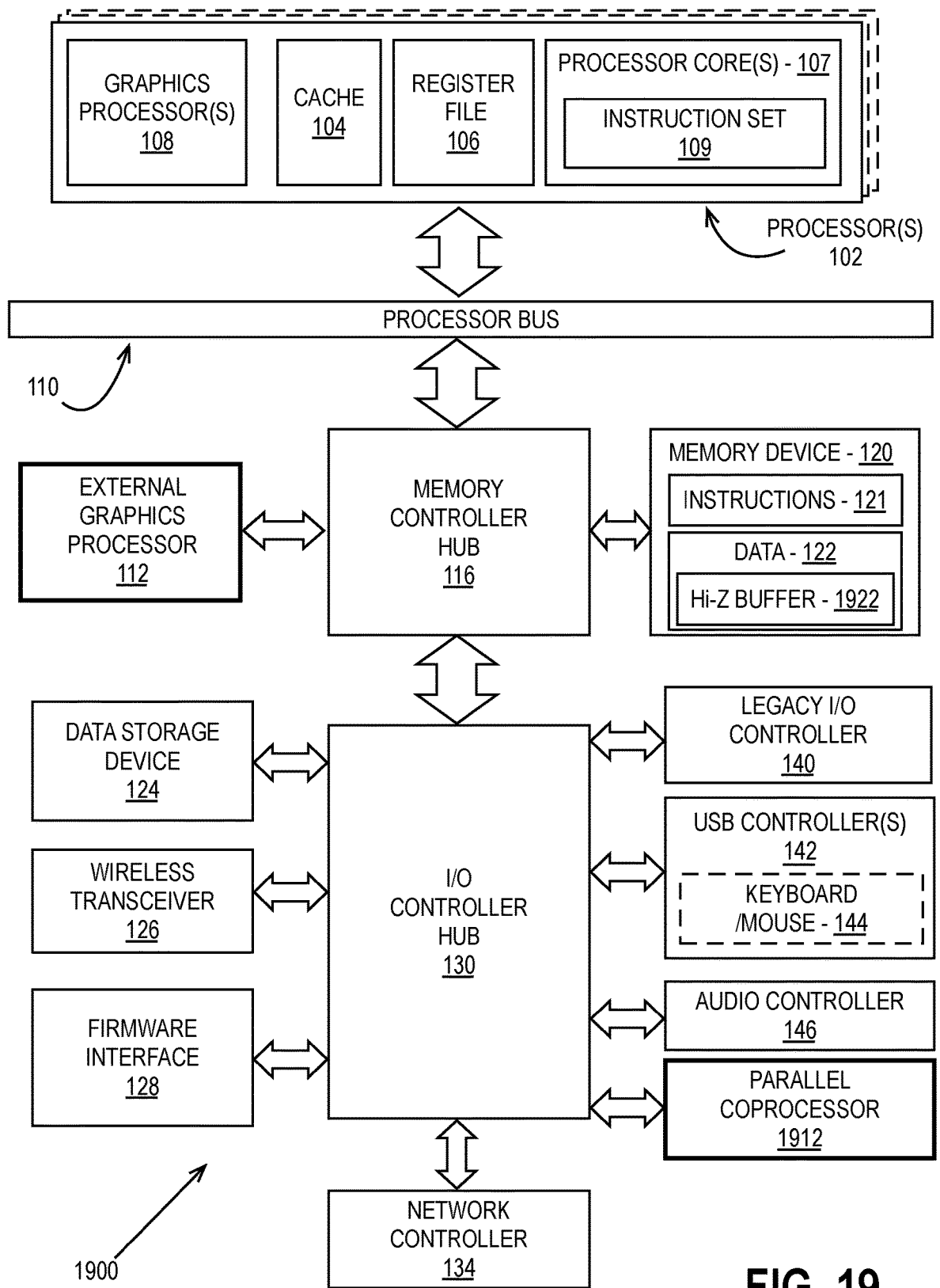
FIG. 19 is a block diagram of a processing system, according to an embodiment.

FIG. 19 is a block diagram of a processing system 1900, according to an embodiment. The processing system 1900 is similar to and includes components of the processing system 100 previously described with respect to FIG. 1, including an external graphics processor 112 coupled via the memory controller hub 116. Alternatively, the system 1900 can include an external graphics processor coupled via the I/O controller hub 130, such as a discrete graphics processor coupled via a PCI express bus. The system 1900 can additionally include a parallel coprocessor 1912 coupled via the I/O controller hub 130, such as a many integrated core parallel coprocessor coupled via the PCI express bus, or another suitable I/O bus or interconnect. The parallel coprocessor 1912 can also be a general-purpose graphics processor configured to perform parallel GPGPU operations.

In one embodiment, the processing system 1900 can be configured to execute software occlusion culling logic on one or more of the processor core(s) 107 or the parallel coprocessor 1912. The Hi-Z data generated by the software occlusion culling logic can be transferred over a memory and/or I/O bus to the memory device 120 to a Hi-Z buffer 1922 stored in memory accessible to the one or more processor core(s) 107 and/or the parallel coprocessor 1912. In one embodiment the memory is also accessible to one or more internal graphics processor (e.g., graphics processor(s) 108) or a discrete graphics processor (e.g., external graphics processor 112). The internal or external graphics processors can then access the Hi-Z buffer 1922 via a shared memory mapping or shared address space. Alternatively, the internal or external graphics processors can access the Hi-Z buffer via a memory copy. The memory copy can be performed via the memory controller hub 116 and/or I/O controller hub 130 and their associated and respective memory and/or I/O busses.

Figure 20:
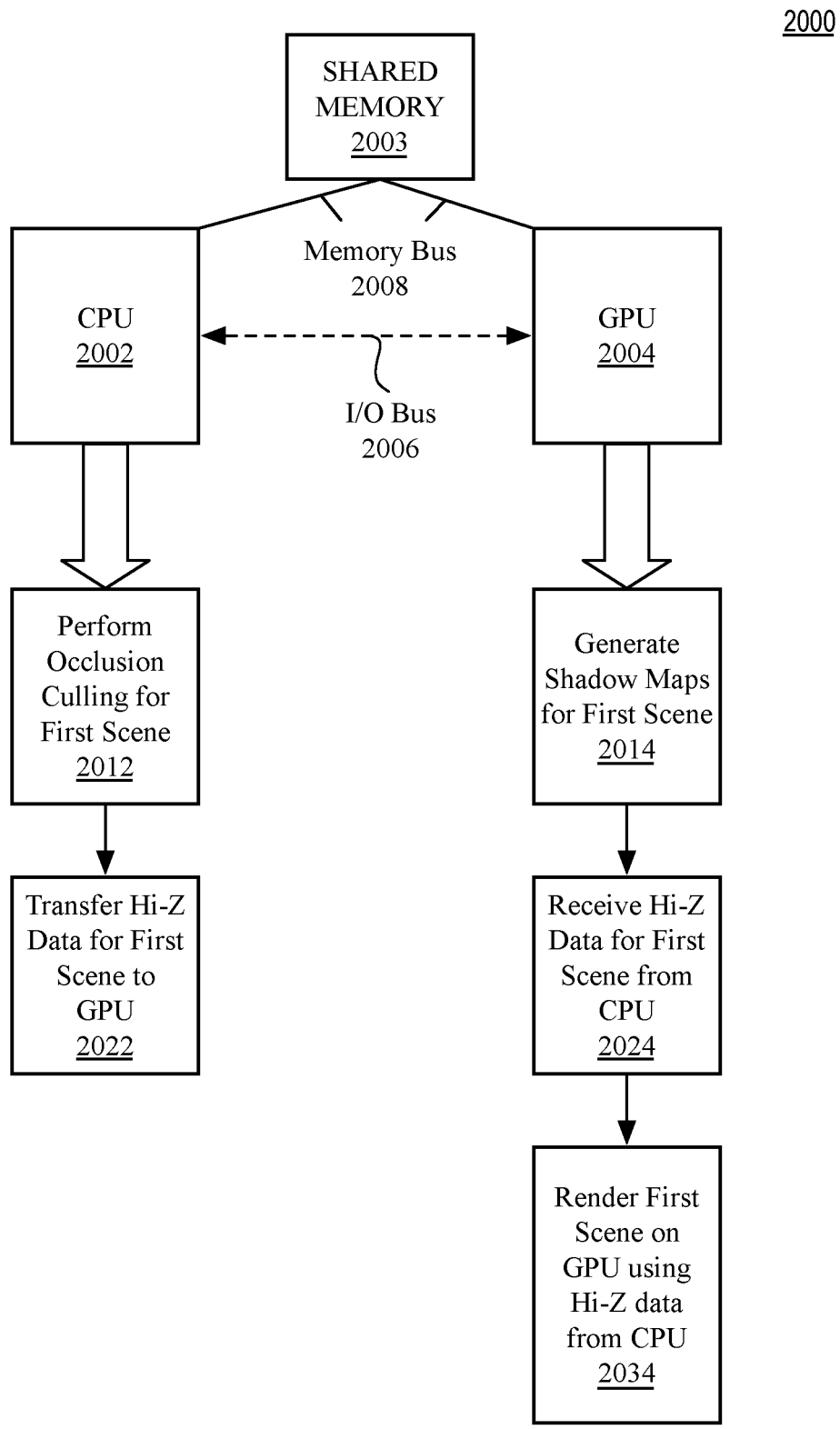
FIG. 20 is an illustration of exemplary rendering operations utilizing hierarchical depth culling for heterogeneous processors.

FIG. 20 is an illustration of exemplary rendering operations utilizing hierarchical depth culling for heterogeneous processors. A system including a CPU 2002, a GPU 2004, and shared memory 2003 can perform alternating rendering operations for a scene. The CPU 2002 and GPU 2004 can be coupled to shared memory 2003 via at least one memory bus 2008, such as in FIG. 18, or via at least one I/O bus 2006 such as in a potential configuration of FIG. 19.

In one exemplary set of rendering operations for a scene, the CPU 2002 can perform (2012) occlusion culling for a first scene, while the GPU 2004 can perform some rendering operation that will not significantly benefit from software occlusion culling. For example, the GPU 2004 can generate (2014) shadow maps for the first scene. The CPU 2002 can then transfer (2022) the generated Hi-Z data for the first scene to the GPU, either via one or more memory writes to mapped video memory via the I/O bus 2006 or by otherwise writing the Hi-Z data to an address space shared between the CPU 2002 and the GPU 2004. The GPU 2004, upon completion of the generation of the shadow maps for the first scene, can receive (2024) the Hi-Z data for the first scene from the CPU via one or more of the memory bus 2008 or the I/O bus 2006. The GPU can then render (2034) the first scene on the GPU using the Hi-Z data received from the CPU 2002.

The rendering operations illustrated are exemplary, and a heterogeneous processing system can be configured to perform any number of parallel rendering operations using Hi-Z priming as described herein.

Figure 21:
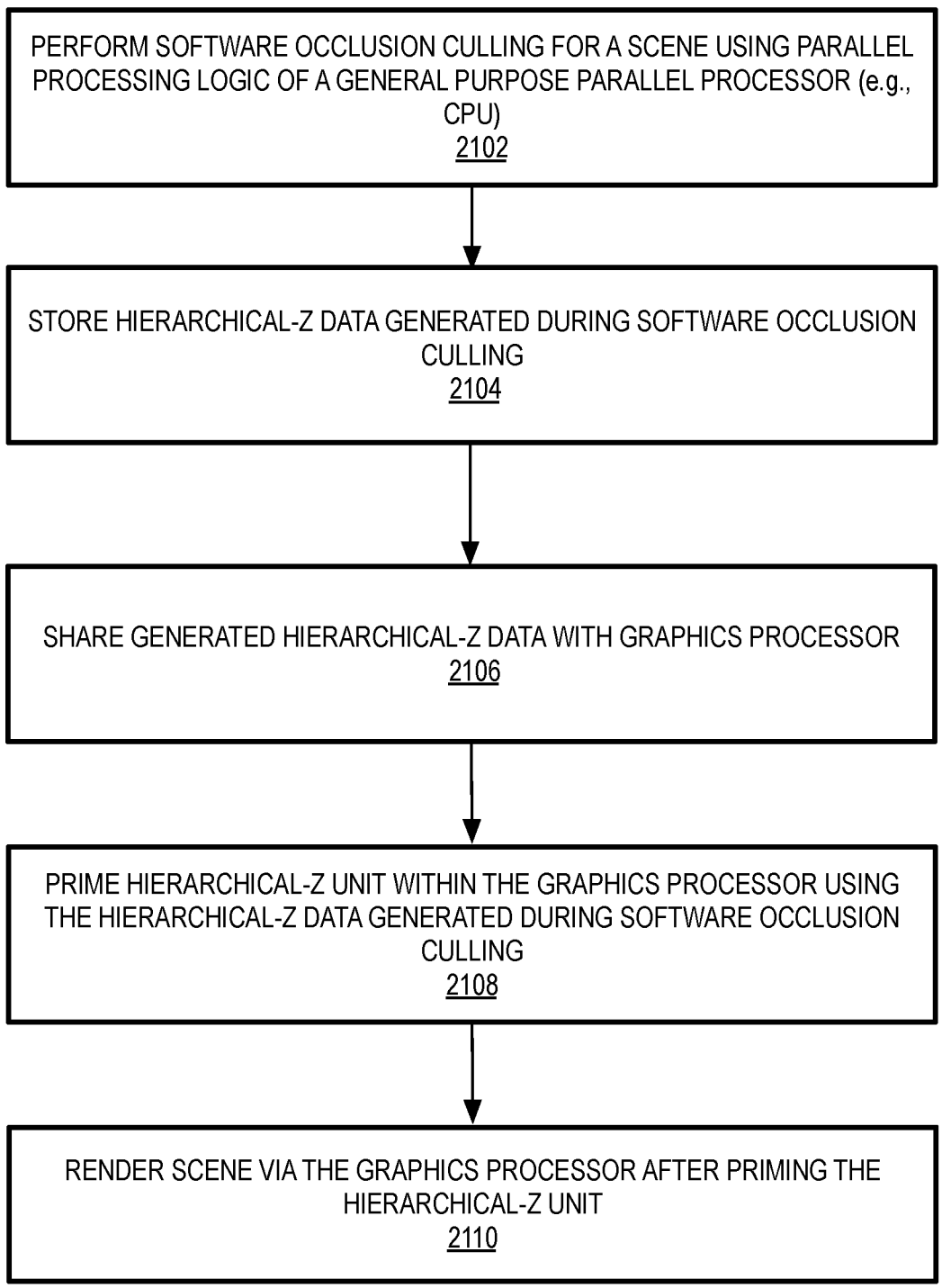
FIG. 21 is a flow diagram illustrating logic to prime a hierarchical-Z unit within a graphics processor, according to an embodiment.

FIG. 21 is a flow diagram illustrating logic 2100 to prime a hierarchical-Z unit within a graphics processor, according to an embodiment. The logic 2100 can be executed by a processing system including at least one general-purpose processor or general-purpose processor core and at least one graphics processor or graphics processor core, such as, but not limited to the processing systems of FIG. 1, FIG. 18 and FIG. 19.

The logic 2100 can cause the processing system to perform software occlusion culling for a scene using parallel processing logic of a general purpose parallel processor, as shown at 2102. The parallel processor can be any CPU or application processor having SIMD or vector processing logic, such as, but not limited to AVX (e.g., AVX, AVX2, etc.) instructions of processors supporting the Intel® x86 ISA. Alternatively, software occlusion culling can be performed using MIPS® SIMD or ARM® NEON instructions, or any other SIMD or vector instructions available via various instruction set architectures suitable for performing the per-tile parallel operations as described herein. In one embodiment, the logic 2100 can perform a complete software occlusion culling operation on the parallel processor, including determining occlusion for one or more objects to be rendered. Such objects can then be culled from the set of objects sent to the graphics processor for rendering. Alternatively, the software occlusion culling logic can bypass occlusion determination for objects of the scene.

The logic 2100 can then cause the processing system to store hierarchical-Z data generated during software occlusion culling, as shown at 2104. In one embodiment the hierarchical-Z data is stored in a hierarchical-Z buffer in memory shared between the parallel processor (e.g., CPU) and a graphics processor of a GPU. At 2106 the logic 2100 can then share the generated hierarchical-Z data with the graphics processor, for example, by passing a pointer to the shared hierarchical-Z buffer.

The logic 2100, for example, via a graphics driver executing on a CPU, can then prime a hierarchical-Z unit within the graphics processor using the hierarchical-Z data generated during software occlusion culling, as shown at 2108. The logic 2100 can then render the scene, or at least a portion of the scene, via the graphics processor after priming the hierarchical-Z unit, as shown at 2110.

Figure 22:
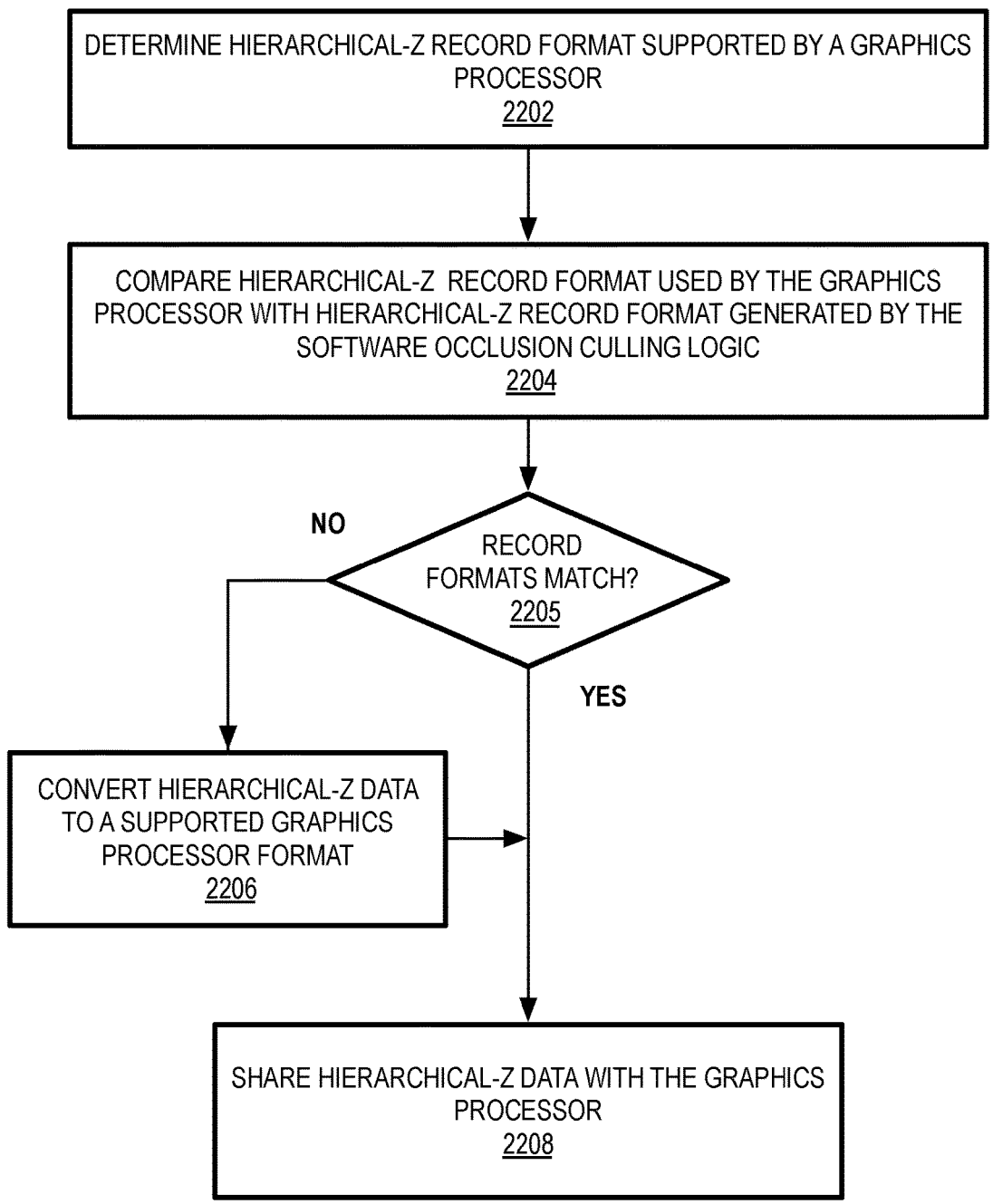
FIG. 22 is a flow diagram of logic to share hierarchical-Z data generated by software occlusion culling logic with a graphics processor, according to an embodiment.

FIG. 22 is a flow diagram of logic 2200 to share hierarchical-Z data generated by software occlusion culling logic with a graphics processor, according to an embodiment. Depth data can be represented various ways and the manner in which the depth data is recorded can vary. Thus, the depth data may be stored on one of several possible record formats. As the software occlusion culling algorithm may use a different hierarchical-Z record format as the graphics processor, the hierarchical-Z data may require conversion or translation. In one embodiment the conversion or translation is performed on a CPU after executing the software occlusion culling algorithm and generating the hierarchical-Z data. In one embodiment the graphics processor can be configured to convert incoming hierarchical-Z data to a format suitable for use by the hierarchical-Z unit of the graphics processor.

The logic 2200 operations include determining a hierarchical-Z record format supported by a graphics processor, as shown at 2202. This information can be known or can be determined via a query to the graphics processor. For example, an API can be provided to enable a query of the graphics processor to determine supported hierarchical-Z record formats. Once the format is determined, the logic 2200 can compare the hierarchical-Z record format used by the graphics processor with the hierarchical-Z record format generated by a software occlusion culling algorithm, as shown at 2204.

A determination can be made at 2205 if the record formats match. If the record formats do not match, the logic 2200 can convert the hierarchical-Z data to a supported graphics processor format, as shown at 2206. After conversion at 2206, or if the record formats match at 2205, the logic 2200 can share the hierarchical-Z data with the graphics processor using any one of the methods described herein, as shown at 2208.

Figure 23:
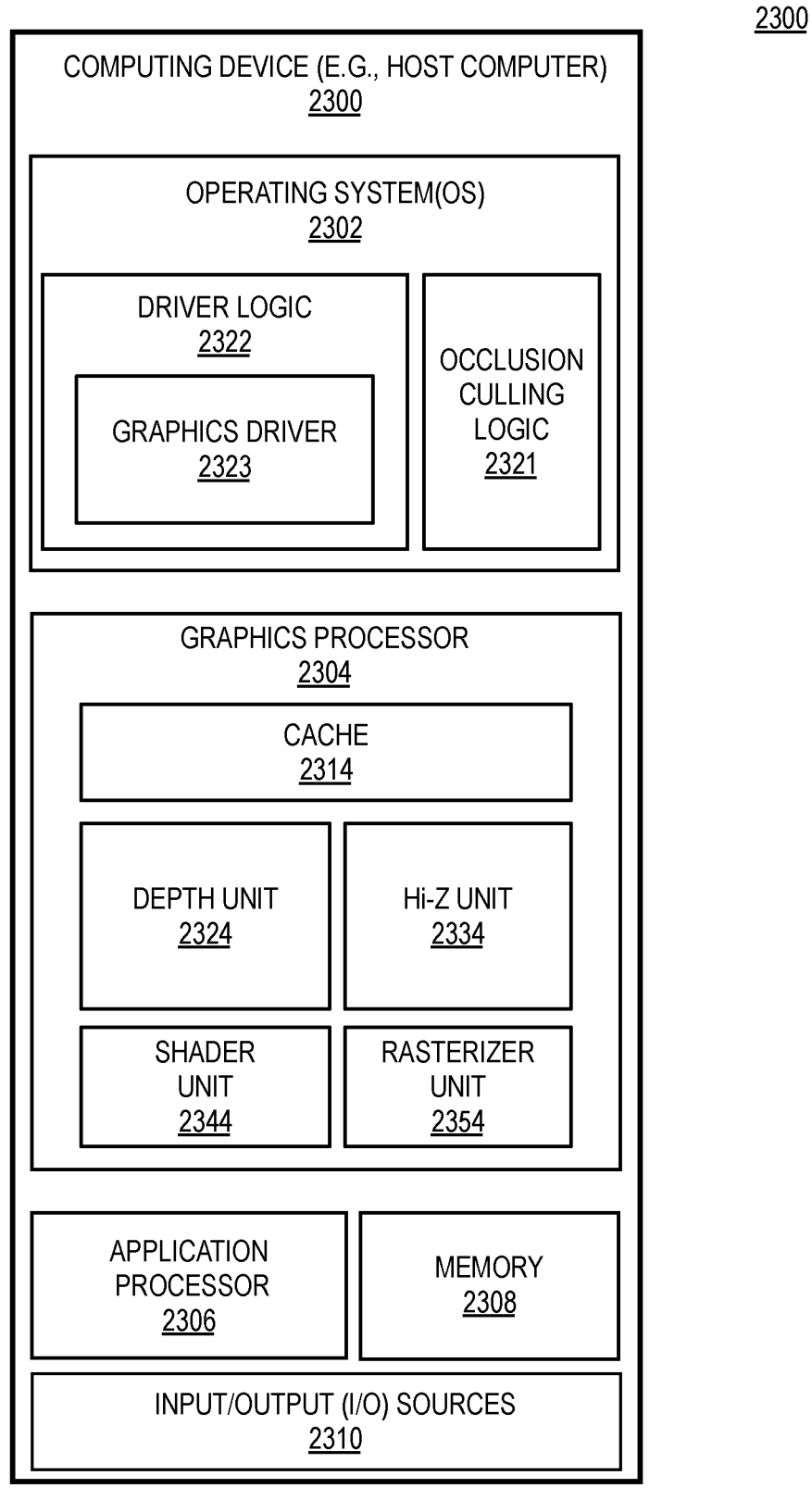
FIG. 23 is a block diagram of a computing device including a graphics processor, according to an embodiment.

FIG. 23 is a block diagram of a computing device 2300 including a graphics processor 2304, according to an embodiment. The computing device 2300 can be a computing device such as the data processing system 100 as in of FIG. 1. The computing device 2300 may also be or be included within a communication device such as a set-top box (e.g., Internet-based cable television set-top boxes, etc.), global positioning system (GPS)-based devices, etc. The computing device 2300 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2300 includes a mobile computing device employing an integrated circuit ("IC"), such as system on a chip ("SoC" or "SOC"), integrating various hardware and/or software components of computing device 2300 on a single chip.

The computing device 2300 includes a graphics processor 2304. The graphics processor 2304 represents any graphics processor described herein. The graphics processor includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics and image resources.

In one embodiment the graphics processor 2304 includes a cache 2314, which can be a single cache or divided into multiple segments of cache memory, including but not limited to any number of L1, L2, L3, or L4 caches, render caches, depth caches, sampler caches, and/or shader unit caches. In one embodiment, the graphics processor 2304 includes a depth unit 2324, a Hi-Z unit 2334, a shader unit 2344, and a rasterizer unit 2354. The Hi-Z unit 2334 of the graphics processor 2304 can be primed with Hi-Z data generated by occlusion culling logic 2321 as described herein.

As illustrated, in one embodiment, and in addition to the graphics processor 2304, the computing device 2300 may further include any number and type of hardware components and/or software components, including, but not limited to an application processor 2306, memory 2308, and input/output (I/O) sources 2310. The application processor 2306 can interact with a hardware graphics pipeline, as illustrated with reference to FIG. 3, to share graphics pipeline functionality. Processed data is stored in a buffer in the hardware graphics pipeline and state information is stored in memory 2308. The resulting data can be transferred to a display controller for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 2306 can include one or processors, such as processor(s) 102 of FIG. 1, and may be the central processing unit (CPU) that is used at least in part to execute an operating system (OS) 2302 for the computing device 2300. The OS 2302 can serve as an interface between hardware and/or physical resources of the computing device 2300 and one or more users. The OS 2302 can include driver logic 2322 for various hardware devices in the computing device 2300. The driver logic 2322 can include graphics driver logic 2323 such as the user mode graphics driver 1026 and/or kernel mode graphics driver 1029 of FIG. 10.

It is contemplated that in some embodiments the graphics processor 2304 may exist as part of the application processor 2306 (such as part of a physical CPU package) in which case, at least a portion of the memory 2308 may be shared by the application processor 2306 and graphics processor 2304, although at least a portion of the memory 2308 may be exclusive to the graphics processor 2304, or the graphics processor 2304 may have a separate store of memory. The memory 2308 may comprise a pre-allocated region of a buffer (e.g., framebuffer); however, it should be understood by one of ordinary skill in the art that the embodiments are not so limited, and that any memory accessible to the lower graphics pipeline may be used. The memory 2308 may include various forms of random access memory (RAM) (e.g., SDRAM, SRAM, etc.) comprising an application that makes use of the graphics processor 2304 to render a desktop or 3D graphics scene. A memory controller hub, such as memory controller hub 116 of FIG. 1, may access data in the memory 2308 and forward it to graphics processor 2304 for graphics pipeline processing. The memory 2308 may be made available to other components within the computing device 2300. For example, any data (e.g., input graphics data) received from various I/O sources 2310 of the computing device 2300 can be temporarily queued into memory 2308 prior to their being operated upon by one or more processor(s) (e.g., application processor 2306) in the implementation of a software program or application. Similarly, data that a software program determines should be sent from the computing device 2300 to an outside entity through one of the computing system interfaces, or stored into an internal storage element, is often temporarily queued in memory 2308 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2310 may include one or more I/O devices that are implemented for transferring data to and/or from the computing device 2300 (e.g., a networking adapter); or, for a large-scale non-volatile storage within the computing device 2300 (e.g., hard disk drive). User input devices, including alphanumeric and other keys, may be used to communicate information and command selections to graphics processor 2304. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 2300 may be employed to observe gestures, record audio and video and to receive and transmit visual and audio commands.

I/O sources 2310 configured as network interfaces can provide access to a network, such as a LAN, a wide area network (WAN), a metropolitan area network (MAN), a personal area network (PAN), Bluetooth, a cloud network, a cellular or mobile network (e.g., 3$^{rd}$ Generation (3G), 4$^{th}$ Generation (4G), etc.), an intranet, the internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2300 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of non-transitory machine-readable media suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One exemplary embodiment provides for a non-transitory machine-readable medium storing instructions which, when executed by one or more processors of a heterogeneous processing system including a general purpose processor and a graphics processor, cause the one or more processors to perform operations comprising performing at least a portion of occlusion culling operations for a scene via the general purpose processor; storing hierarchical depth data generated by the occlusion culling operations; sharing the hierarchical depth data with the graphics processor; priming a hierarchical depth unit of the graphics processor using the hierarchical depth data; and rendering at least a portion of the scene via the graphics processor after priming the hierarchical depth unit.

In one embodiment, sharing the hierarchical depth data with the graphics processor additionally includes determining a first hierarchical depth record format supported by the graphics processor comparing the first hierarchical depth record format supported by the graphics processor with a second hierarchical depth record format generated by the occlusion culling operations; determining whether the first hierarchical depth record format matches the second hierarchical depth record format; and converting the second hierarchical depth record format to the first hierarchical depth record format in response to determining that the first hierarchical depth record format does not match the second hierarchical depth record format.

One embodiment provides for a heterogeneous processing system comprising a general purpose processor including parallel processing logic to perform an occlusion culling operation for a scene and generate hierarchical depth data; and a graphics processor coupled with the general purpose processor, the graphics processor including a hierarchical depth unit configured to perform a hierarchical depth test, the graphics processor to read the hierarchical depth data and prime the hierarchical depth unit before rendering the scene.

One embodiment provides for a data processing system comprising a graphics processor coupled to a general purpose processor on a same die; a memory coupled to the graphics processor and the general purpose processor, the memory to store hierarchical depth data generated by the general purpose processor; and a display device to display a scene rendered by the graphics processor, the graphics processor including a hierarchical depth unit, wherein to render the scene includes to configure the hierarchical depth unit to read hierarchical depth data generated by the general purpose processor and cull one or more objects from the scene based at least in part on the hierarchical depth data generated by the general purpose processor.

In one embodiment the data processing system includes a driver configured to execute on the general purpose processor. The driver can configure the graphics processor to prime the hierarchical depth unit and render at least a portion of the scene using the primed hierarchical depth unit, where to prime the hierarchical depth unit, the graphics processor can configure the hierarchical depth unit to read hierarchical depth data from the hierarchical depth buffer stored in the memory. If updates are configured, the graphics processor can update the hierarchical depth data during the render and write updated hierarchical depth data to the hierarchical depth buffer.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A non-transitory machine-readable medium storing instructions which, when executed by one or more processors of a heterogeneous processing system including a general purpose processor and a graphics processor, cause the one or more processors to perform operations comprising:
    performing at least a portion of occlusion culling operations for a scene including a plurality of tiles via the general purpose processor to generate hierarchical depth data including maximum and minimum depth bound values for each tile;
    storing hierarchical depth data generated by the occlusion culling operations;
    sharing the hierarchical depth data with the graphics processor, wherein sharing includes determining a first hierarchical depth record format supported by the graphics processor, and comparing the first hierarchical depth record format supported by the graphics processor with a second hierarchical depth record format generated by the occlusion culling operations;
    priming a hierarchical depth unit of the graphics processor using the generated hierarchical depth data including the maximum and minimum depth bound values; and
    rendering at least a portion of the scene via the graphics processor after priming the hierarchical depth unit.

2. The non-transitory machine-readable medium as in claim 1, wherein the instructions performing the occlusion culling algorithm for the scene include one or more parallel processing instructions.

3. The non-transitory machine-readable medium as in claim 1, wherein storing the hierarchical depth data generated by the occlusion culling operations includes writing the hierarchical depth data to a hierarchical depth buffer.

4. The non-transitory machine-readable medium as in claim 3, writing the hierarchical depth data to the hierarchical depth buffer includes writing the hierarchical depth buffer to memory within an address space mapped to the general purpose processor.

5. The non-transitory machine-readable medium as in claim 4, wherein the memory within the address space mapped to the general purpose processor is additionally mapped within an address space of the graphics processor.

6. The non-transitory machine-readable medium as in claim 5, wherein sharing the hierarchical depth data with the graphics processor includes passing a pointer to the hierarchical depth buffer to the graphics processor.

7. The non-transitory machine-readable medium as in claim 1, wherein sharing the hierarchical depth data with the graphics processor includes copying the hierarchical depth data to memory accessible to the graphics processor.

8. The non-transitory machine-readable medium as in claim 1, wherein priming the hierarchical depth unit of the graphics processor using the hierarchical depth data includes configuring the hierarchical depth unit of the graphics processor to read hierarchical depth data generated by the occlusion culling operations.

9. The non-transitory machine-readable medium as in claim 1, wherein rendering at least the portion of the scene via the graphics processor after priming the hierarchical depth unit includes culling a geometric object during rasterization of the scene, the culling performed based on the hierarchical depth data generated by the occlusion culling operations.

10. The non-transitory machine-readable medium as in claim 9, wherein rendering at least the portion of the scene via the graphics processor includes updating the hierarchical depth data generated by the occlusion culling operations via the hierarchical depth unit.

11. The non-transitory machine-readable medium as in claim 10, wherein rendering at least the portion of the scene via the graphics processor after priming the hierarchical depth unit includes culling a sample or pixel associated with the geometric object prior to shading the sample or pixel, the culling performed based on the hierarchical depth data generated by the occlusion culling operations.

12. The non-transitory machine-readable medium as in claim 1, wherein sharing the hierarchical depth data with the graphics processor additionally includes:
determining whether the first hierarchical depth record format matches the second hierarchical depth record format; and
converting the second hierarchical depth record format to the first hierarchical depth record format in response to determining that the first hierarchical depth record format does not match the second hierarchical depth record format.

13. A heterogeneous processing system comprising:
a general purpose processor including parallel processing logic to perform an occlusion culling operation for a scene including a plurality of tiles in generating hierarchical depth data including maximum and minimum depth bound values for each tile; and
a graphics processor coupled with the general purpose processor, the graphics processor including a hierarchical depth unit configured to perform a hierarchical depth test, the graphics processor to prime the hierarchical depth unit with the generated hierarchical depth data including the maximum and minimum depth bound values and to render at least a portion of the scene after the hierarchical depth unit is primed, wherein the general purpose processor is further to write the hierarchical depth data to an address in an address space shared with the graphics processor, determine a first hierarchical depth record format supported by the graphics processor, and compare the first hierarchical depth record format supported by the graphics processor with a second hierarchical depth record format generated by the occlusion culling operations.

14. The heterogeneous processing system as in claim 13, wherein the graphics processor is read the hierarchical depth data from an address in an address space shared with the general purpose processor.

15. The heterogeneous processing system as in claim 13, wherein the general purpose processor and the graphics processor are to perform operations for the scene in parallel, the graphics processor to perform the occlusion culling operation while the graphics processor is to perform one or more other rendering operations for the scene.

16. A data processing system comprising:
a graphics processor coupled to a general purpose processor on a same die;
a memory coupled to the graphics processor and the general purpose processor, the memory to store hierarchical depth data including maximum and minimum depth bound values for each tile of a scene generated by the general purpose processor using occlusion culling operations, wherein the general purpose processor is further to write the hierarchical depth data to an address in an address space shared with the graphics processor, determine a first hierarchical depth record format supported by the graphics processor, and compare the first hierarchical depth record format supported by the graphics processor with a second hierarchical depth record format generated by the occlusion culling operations; and
a display device to display the scene rendered by the graphics processor, the graphics processor including a hierarchical depth unit, wherein to render the scene includes to configure the hierarchical depth unit to read hierarchical depth data including the maximum and minimum depth bound values generated by the general purpose processor and cull one or more objects from the scene based at least in part on the hierarchical depth data generated by the general purpose processor.

17. The data processing system as in claim 16, wherein:
the general purpose processor is to execute one or more occlusion culling operations to generate the hierarchical depth data;
the memory is additionally to store a hierarchical depth buffer including the hierarchical depth data;
the general purpose processor is to write the hierarchical depth data to the hierarchical depth buffer; and
the graphics processor is to read the hierarchical depth data from the hierarchical depth buffer.

18. The data processing system as in claim 17, wherein a driver configured to execute on the general purpose processor is to:
configure the graphics processor to prime the hierarchical depth unit and render at least a portion of the scene using the primed hierarchical depth unit, wherein to prime the hierarchical depth unit, the graphics processor to configure the hierarchical depth unit to read hierarchical depth data from the hierarchical depth buffer stored in the memory.

19. The data processing system as in claim 18, wherein the graphics processor is configured to update the hierarchical depth data during the render and write updated hierarchical depth data to the hierarchical depth buffer.

* * * * *